Sept. 4, 1962  A. GOODMAN ET AL  3,052,120
PLANAR MOTION MECHANISM AND SYSTEM
Filed May 29, 1959  14 Sheets-Sheet 1

FIG. I.

INVENTORS
ALEX GOODMAN
MORTON GERTLER

BY
*B. L. Zamgarll*
ATTORNEYS

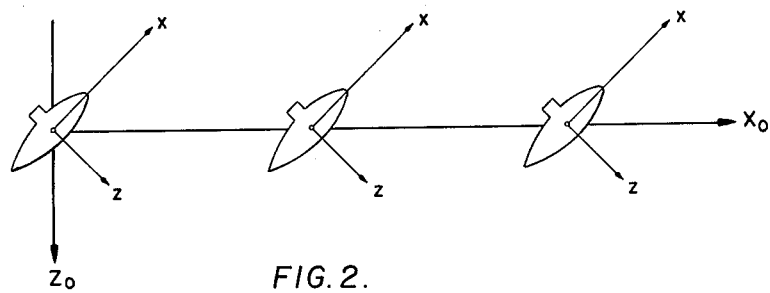
FIG. 2.
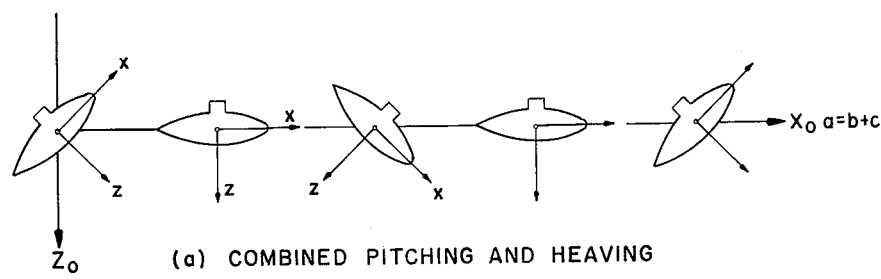
(a) COMBINED PITCHING AND HEAVING
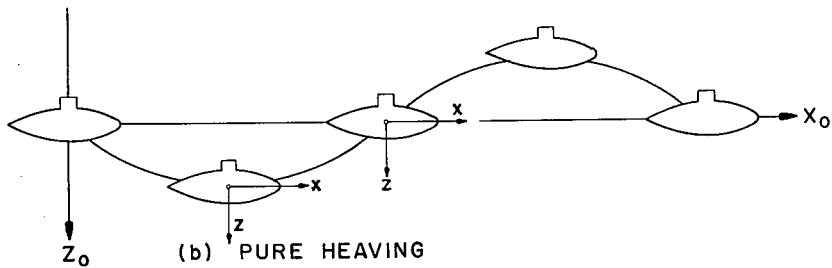
(b) PURE HEAVING
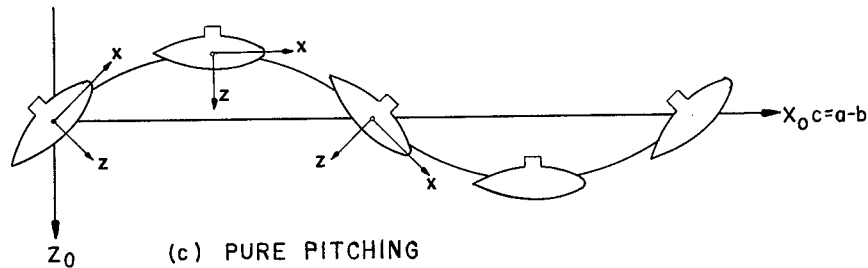
(c) PURE PITCHING
FIG. 3.

FIG. 5.
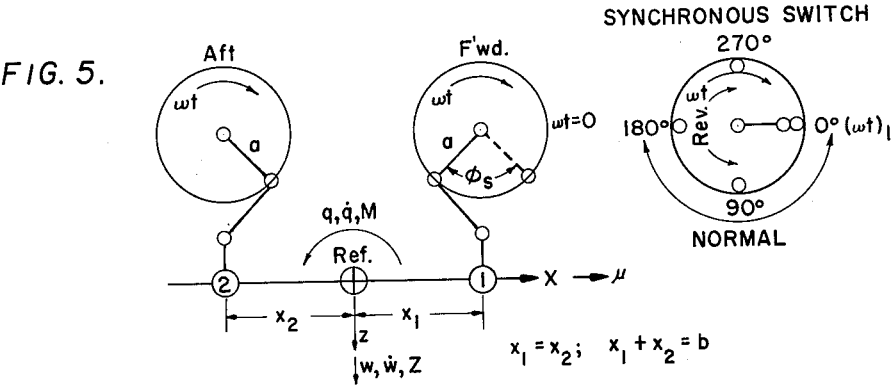
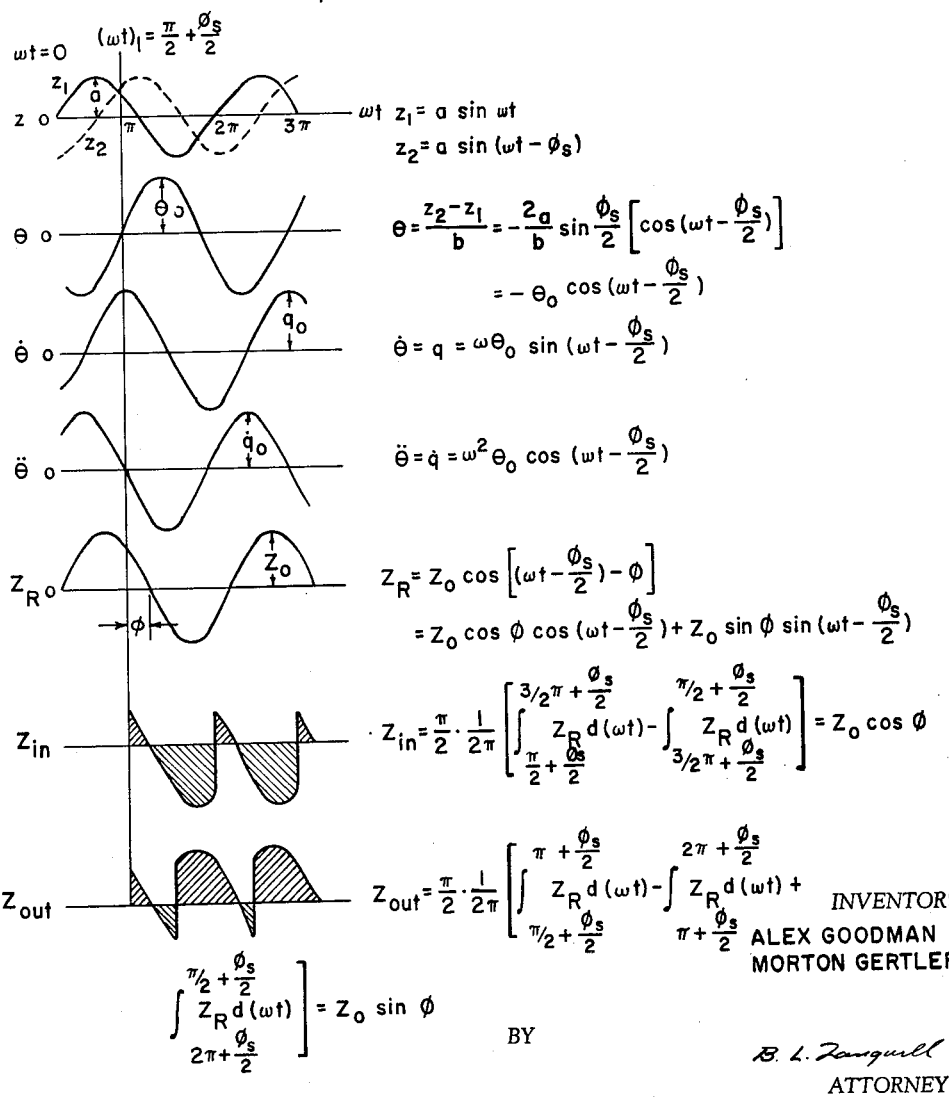

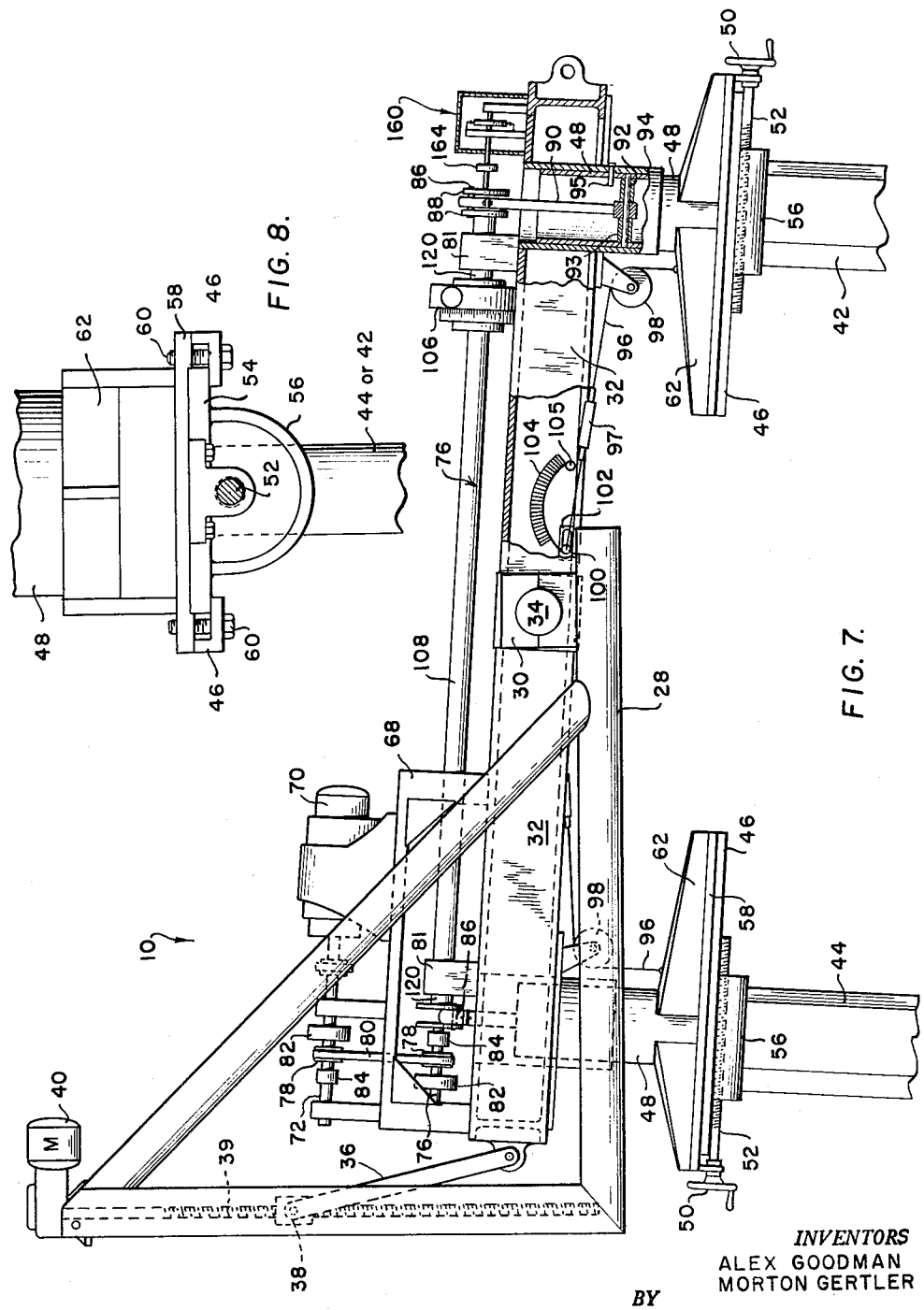

INVENTORS
ALEX GOODMAN
MORTON GERTLER

ATTORNEYS

Sept. 4, 1962 A. GOODMAN ET AL 3,052,120
PLANAR MOTION MECHANISM AND SYSTEM
Filed May 29, 1959 14 Sheets—Sheet 8
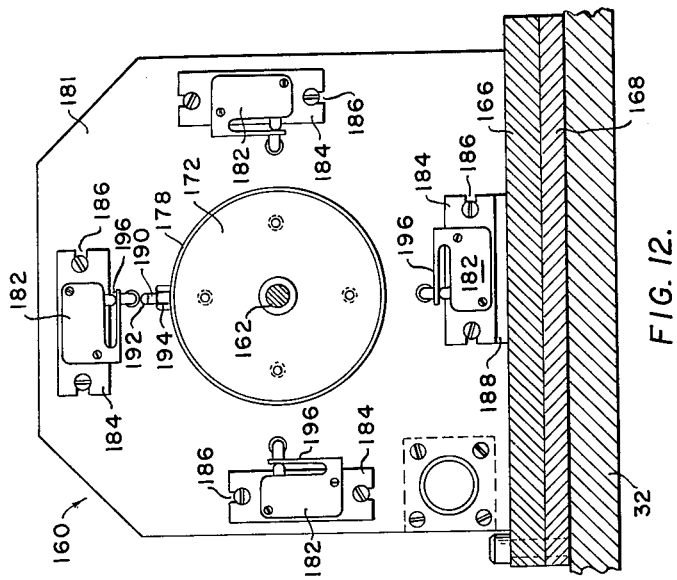
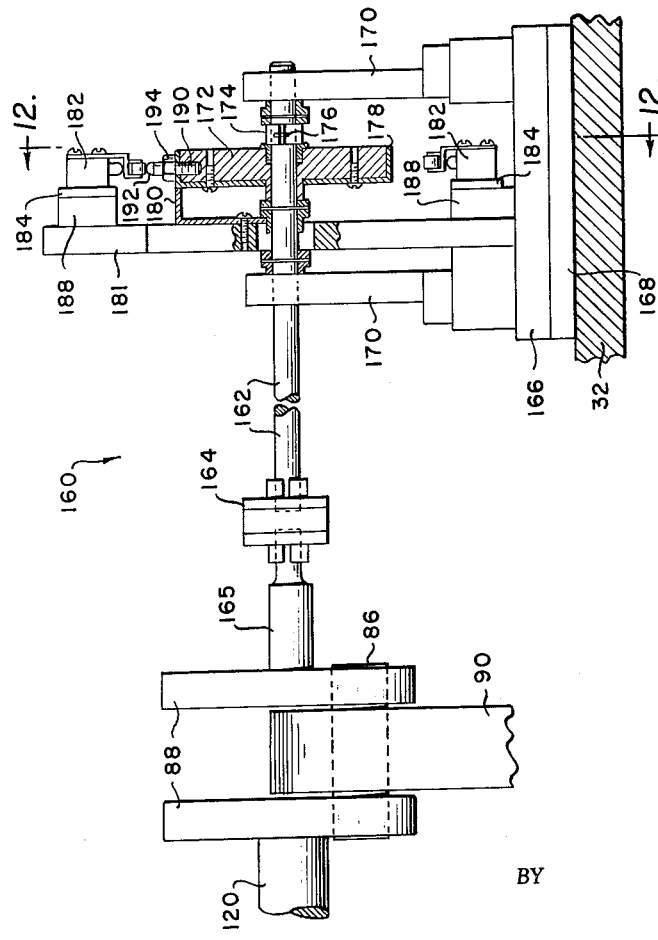
INVENTORS
ALEX GOODMAN
MORTON GERTLER
BY
B. L. Zangwill
ATTORNEY

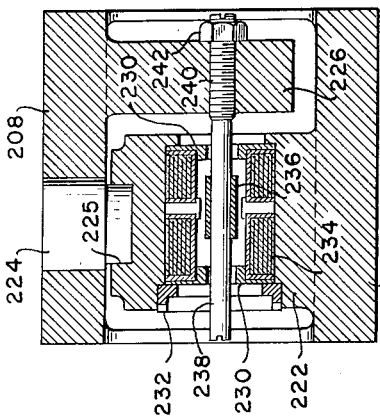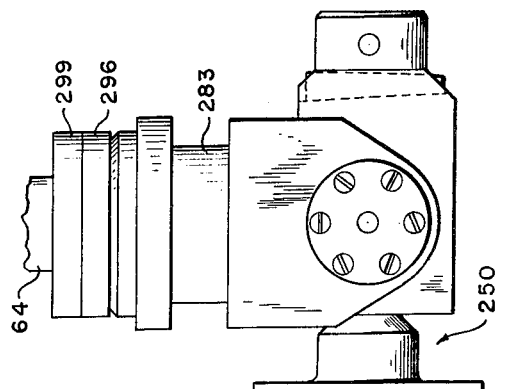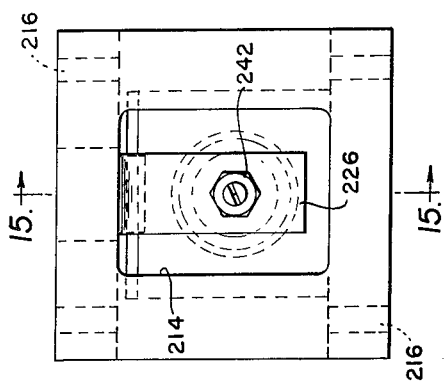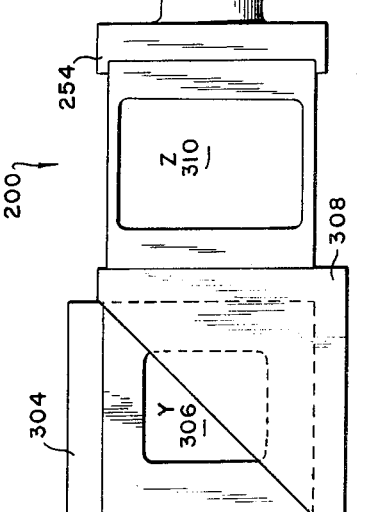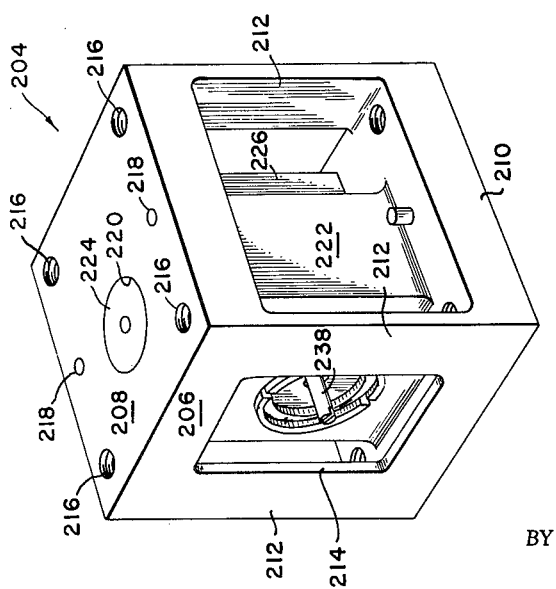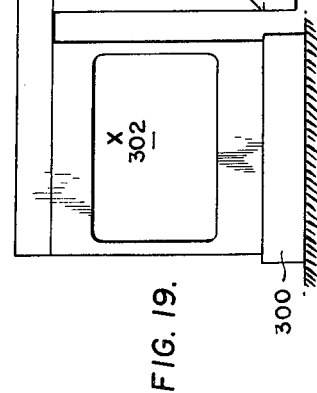
INVENTORS
ALEX GOODMAN
MORTON GERTLER
ATTORNEYS

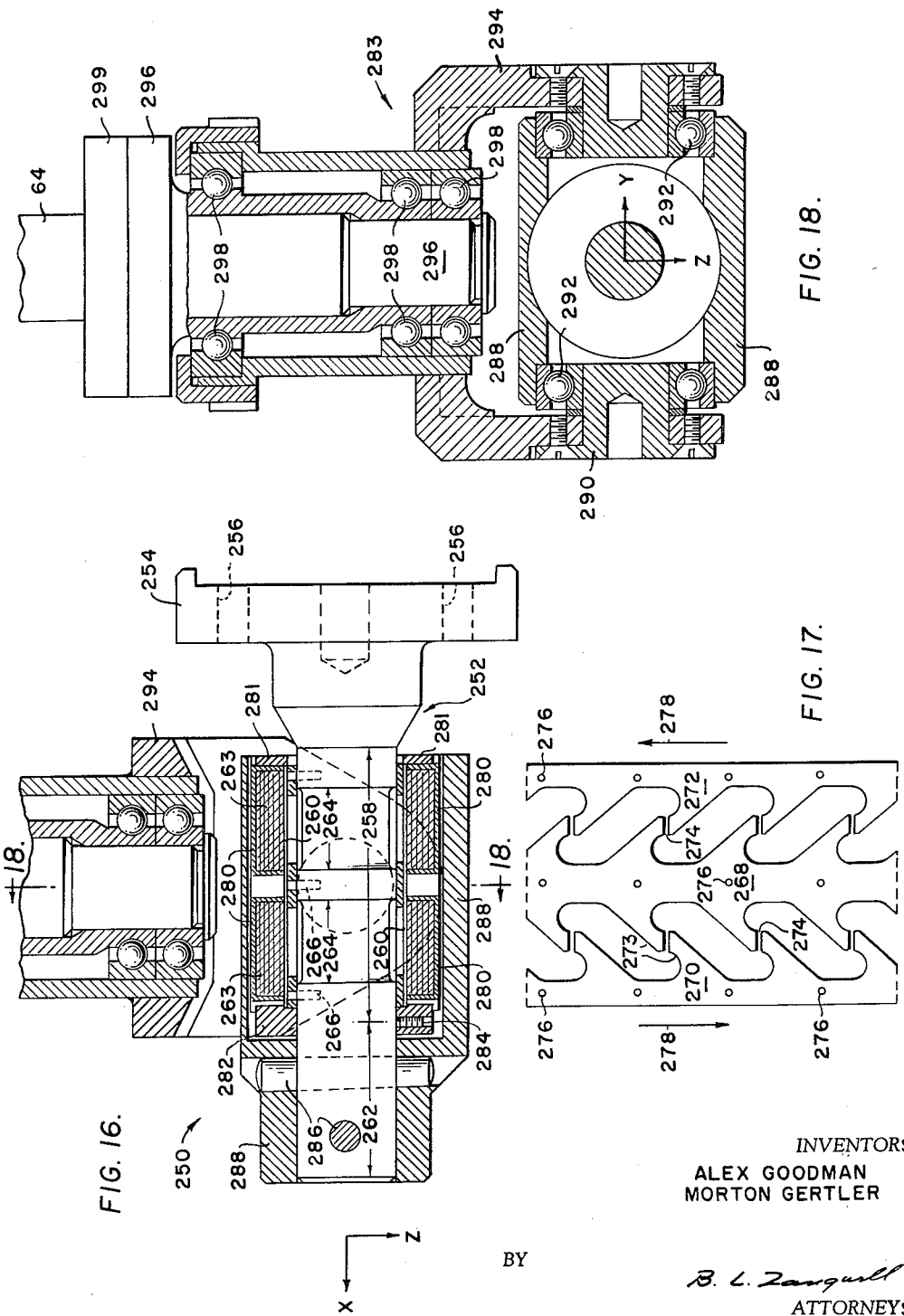

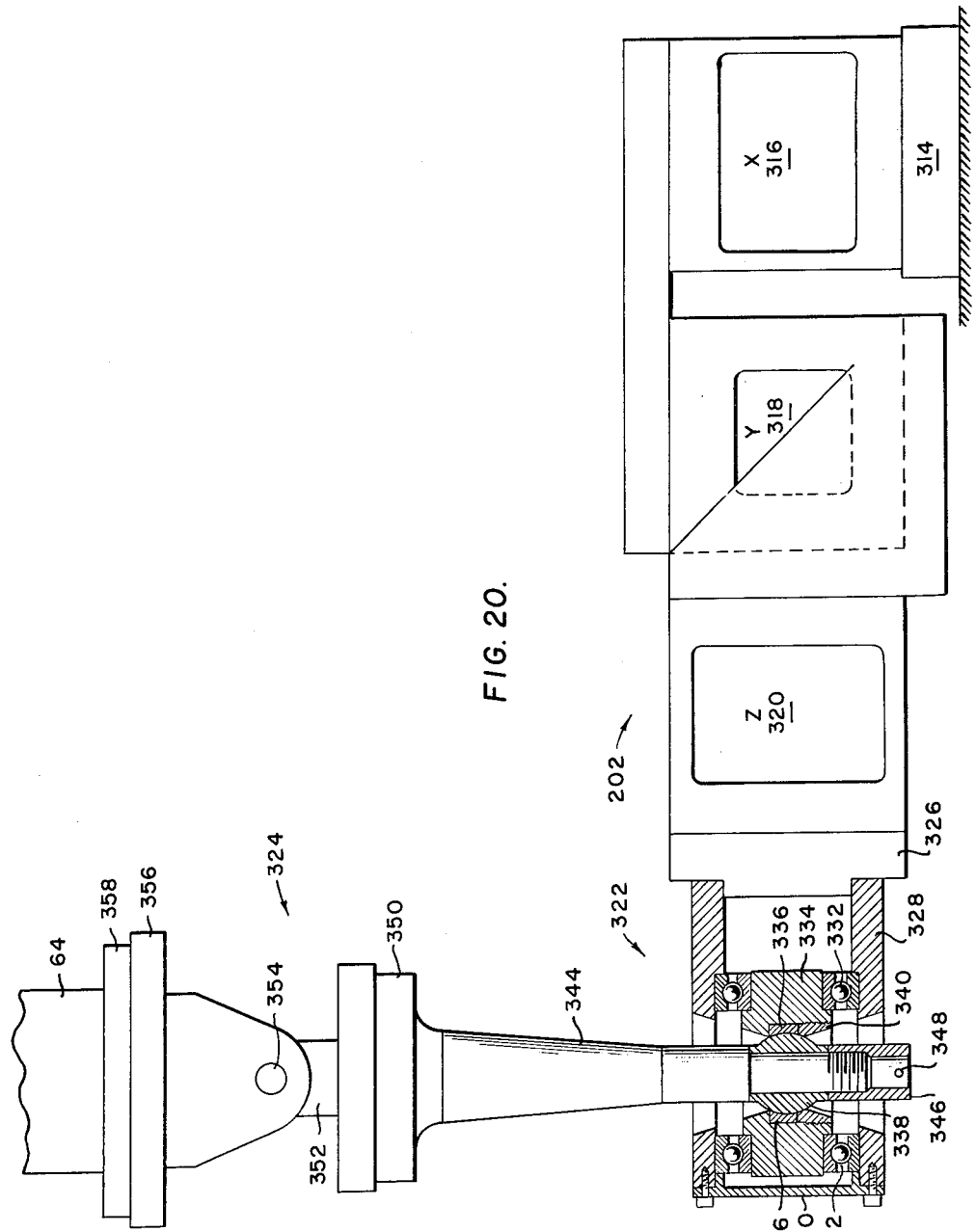

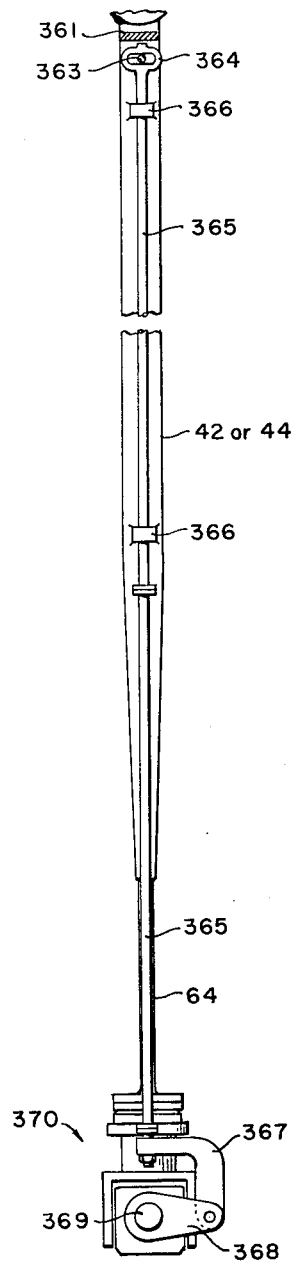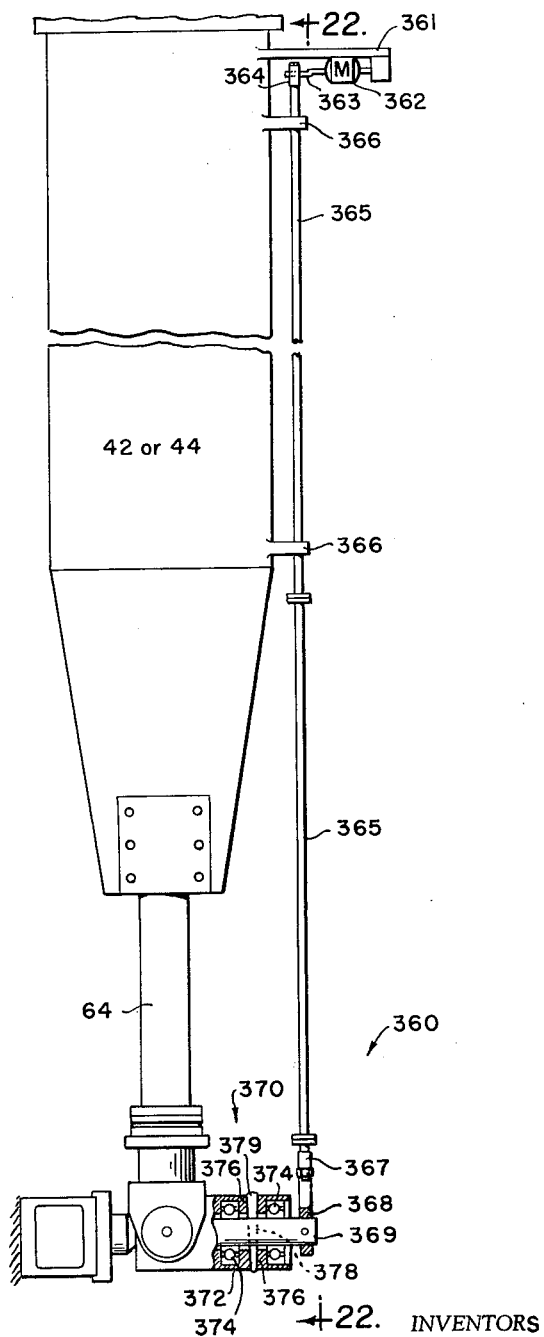
FIG. 22.
FIG. 21.

INVENTORS
ALEX GOODMAN
MORTON GERTLER

United States Patent Office

3,052,120
Patented Sept. 4, 1962

3,052,120
PLANAR MOTION MECHANISM AND SYSTEM
Alex Goodman and Morton Gertler, Silver Spring, Md., assignors to the United States of America as represented by the Secretary of the Navy
Filed May 29, 1959, Ser. No. 817,002
28 Claims. (Cl. 73—148)
(Granted under Title 35, U.S. Code (1952), sec. 266)

The invention described herein may be manufactured and used by or for the Government of the United States of America for governmental purposes without the payment of any royalties thereon or therefor.

This invention relates to tow-testing of bodies or models, especially ship models; and more particularly relates to a means for enabling the experimental determination of the hydrodynamic characteristics of a body or model that moves through a fluid; and especially relates to the determination of the hydrodynamic-stability coefficients required for the equations of motion of a submerged body or model, for example a submarine, in six degrees of freedom of motion.

The stability and control characteristics of a submerged body moving through a fluid can be understood best on the basis of a thorough analysis of the differential equations which govern its motion. These equations of motion comprise numerous coefficients or derivatives which are of hydrodynamic origin, and which are usually classified into the three categories of static-stability, rotary-stability, and acceleration derivatives. Consequently, to obtain solutions for any given configuration of the body it is necessary to know these coefficients with reasonable accuracy. Many attempts have been made in the past to fulfill this requirement by utilizing various experimental and theoretical techniques, or combinations of both.

Among the experimental methods used, fairly refined techniques have been developed by model basins and wind tunnels for measuring forces and moments due to hull orientation; the so-called static stability coefficients. However, the various experimental methods used to determine forces and moments associated with variations in angular velocity, linear acceleration, and angular acceleration have been less successful. The techniques that have been tried in this respect include facilities such as the rotating arm, free oscillator, forced oscillator, curved-flow tunnel, and curved models in a straight flow facility. Some of these facilities may eventually provide the required accuracy. However, the desired stage of refinement has not been reached due to problems such as instrumentation and model support.

The theoretical means employed to obtain hydrodynamic coefficients also have been inadequate. With bare-body configurations, theory has been used with reasonable success to compute coefficients such as added mass and added moment of inertia which are amenable to treatment on the basis of potential flow considerations. However, coefficients which are primarily due to viscous flow, such as "static" and "rotary" forces and moments, are not obtained reliably with existing theory. With configurations which include appendages such as control surfaces, decks, fairwaters, and propellers, the calculations based on existing theory become even more suspect.

The derivations and composition of the equations of motion have formed the subject of numerous text books and papers. For the purpose of this application, therefore, only the general nature of these equations are considered. This is done to give some insight into the problems which must be faced in the design of experimental facilities for the evaluation of the equations.

The hydrodynamic forces and moments which enter into the equations of motion as coefficients are usually classified into three categories: static, rotary, and acceleration. The static coefficients are due to components of linear velocity of the body relative to the fluid; the rotary coefficients are due to angular velocity; and the acceleration coefficients are due to either linear or angular acceleration. Within limited ranges, the coefficients are linear with respect to the appropriate variables and thus may be utilized as static, rotary, and acceleration derivatives in linearized equations of motion.

It may be concluded from the foregoing classification, that the experimental determination of the coefficients of the equations of motion requires facilities which will impart linear and angular velocities and accelerations to a given body with respect to a fluid. For example, the usual basin facilities have carriages designed to tow models in a straight line at constant speed. Such facilities can be equipped to orient models in either pitch or yaw to obtain the static coefficients. However, more specialized types of facilities, such as a rotating arm or oscillator, are required to impart the angular velocities that are necessary to obtain rotary coefficients. The oscillator type of facility provides also linear and angular accelerations so that the acceleration coefficients may be determined experimentally.

The choice of a suitable facility for determining hydrodynamic coefficients involves many considerations pertaining to accuracy, expediency, and ease of data analysis. A detailed treatment of these problems is beyond the scope of this application. However, of primary concern is the degree to which the experimental technique involves explicit relationships and avoids the need for solutions of matrices. Also techniques which involve extrapolations should be avoided. To illustrate, a carriage which tows a model at uniform velocity in straight-line pitched or yawed flight is a direct and explicit means of determining static coefficients. Similarly, a rotating arm which tows a model at uniform angular velocity and tangential to the circular path at each of several different radii is a means for determining rotary coefficients explicitly. On the other hand, the use of the rotating arm to obtain static coefficients should be considered as an indirect procedure since the data much be extrapolated to infinite radius. The usual oscillator techniques are even more indirect and, at best require solutions of simultaneous equations to obtain rotary and acceleration derivatives.

Each of the techniques mentioned can be used most advantageously for obtaining one category of hydrodynamic coefficients. The straight-line towing carriage supplies only the static coefficients. The rotating arm supplies rotary coefficients directly and static coefficients indirectly. The oscillator supplies all three categories of coefficients, but all indirectly.

The foregoing considerations suggest the desirability of having a single system to determine explicitly all of the coefficients required in the equations of motion for six degrees of freedom. To accomplish this objective, it is necessary to develop a facility which can move a body through water with "hydrodynamically pure" linear velocities, angular velocities, linear accelerations, and angular accelerations in all degrees of freedom. This concept forms the basis of the invention which includes means designated as a planar-motion mechanism and system.

It is an object of the invention to provide a mechanism and system which will enable the direct determination of the coefficients of motion of a body moving through water.

It is a further object of the invention to provide a single simplified means that will more directly provide the coefficients for the equations of motion of a movable body having one or more or all six degrees of freedom of motion.

A further object of the invention is to provide a means for moving a body being towed relative to a fluid, the means being capable of moving the body in different kinds of motion, and containing equipment within the model capable of directly measurably sensing the forces on the body during such motions.

Another object of the invention is the provision of a single means that can be adjusted to impart hydrodynamically pure pitching or pure heaving motion to a given submerged test body. The means may also be adjusted to impart any combination of pitching and heaving to the body.

Still another object of the invention is to provide a means for testing bodies or models that provides data for the determination of individual coefficients and derivatives for the motion equations thereof; the data being such as to permit solutions with a minimum of subsequent mathematical analysis and processing.

An object of the invention is to provide a combination of towing carriage and mechanism for towing a body through water, the mechanism including means for superimposing selected sinusoidal motions on the body in addition to that caused solely by the travelling motion of the carriage.

Another object of the invention is to provide a mechanism for a towing carriage by means of which a measurable pitching or a heaving motion can be imparted to a towed model, the mechanism being further characterized by enabling motion to be imparted to the model with any desired combination of pitching and heaving components, and being further characterized by a means for directly ascertaining the forces on the model along each of a plurality of axes of the model.

To this end, in accordance with the invention, the mechanism comprises two vertically movable struts spaced in the direction for linear movement of a model or body to be towed by a carriage or the equivalent. The struts are carried by the carriage and in turn can carry the model with the center of gravity of the model at the midpoint of the linear distance between the struts. The mechanism includes means for continuously vertically oscillating the struts in phase, 180 degrees out of phase, or in any out of phase relation while the model is being towed so as to result in a motion for the model that is pure pitching or pure heaving or combined motion including both.

Another object of the invention is the provision of a roll oscillator in the mechanism which can impart a rolling motion to a submerged body so that all rotary forces in three dimensions on the body may be responsively sensed and measured.

Further in accordance with the invention, an electrical measuring and recording system is provided directly to measure the various forces and moments on the body as it is being moved in water. Preferably a balance system is provided for sensing the forces, which differs distinctly from the multi-component dynamometers used in other model-basin or wind-tunnel testing facilities. The balance system is composed of a plurality of modula flexural gages employing variable-reluctance transducers, each of which individually measures or senses a single force in either the X-, Y- or Z-direction depending upon orientation. Roll moment is obtained by a torsional gage which is sensitive only to a moment about a single axis. A measuring or sensing system is thus produced which is mechanically free of interactions; and consequently the calibration of each gage is unaffected by whatever other loads may be imposed on the system. The recording system is automatic upon command and contains features which are intended to reduce data processing to a minimum. The sensing measurements pass through a resolver and integrator, and are recorded as essentially discrete values of in-phase and quadrature force components.

Other objects and many of the attendant advantages of this invention will be readily appreciated as the same becomes better understood by reference to the following detailed description when considered in connection with a specific preferred embodiment, to which the invention is not limited, and the accompanying drawings wherein:

FIG. 2 is a schematic diagram illustrating a model being moved in an X-direction by a carriage, the model being in a fixed tilted position in the Y-direction;

FIG. 3 is a diagram, similar to FIG. 2, illustrating oscillation types of towed motion wherein:

FIG. 3(a) is a diagram illustrating combined pitching and heaving motion of a model;

FIG. 3(b) is a diagram illustrating pure heaving motion of a model made possible with the invention; and FIG. 3(c) is a diagram illustrating pure pitching of a model made possible with the invention;

FIG. 5 is a chart useful in an analysis for pure pitching motion;

FIG. 7 is an enlarged view, mostly in elevation and partly in cross-section, of the planar motion mechanism;

FIG. 8 is a detail view of the strut attachment to a piston of the mechanism;

FIG. 11 is a side view, partly in cross-section, of a synchronous switch of the mechanism;

FIG. 12 is an end view, partly in cross-section taken along line 12—12 of FIG. 11, of the synchronous switch;

FIG. 13 is an isometric view of a modular force gage of the mechanism;

FIG. 14 is a view in elevation of a flexural face of the modular force gage;

FIG. 15 is a view, in cross-section, of the modular force gage taken on line 15—15 of FIG. 14;

FIG. 16 is a view, in cross-section, of a roll gage of the mechanism;

FIG. 17 is a developed view of an armature of the roll gage;

FIG. 18 is a view, in cross-section, of a gimbal of the roll gage showing ball bearings therein;

FIG. 19 is a side elevational view of the forward strut assembly of the mechanism;

FIG. 20 is a side elevational view, partly in cross-section, of the aft strut gage assembly;

FIG. 21 is a side elevational view, partly in cross-section, of a roll oscillator of the mechanism;

FIG. 22 is an end view of the roll oscillator looking in the direction of the arrows of line 22—22 of FIG. 21;

Figure 1:
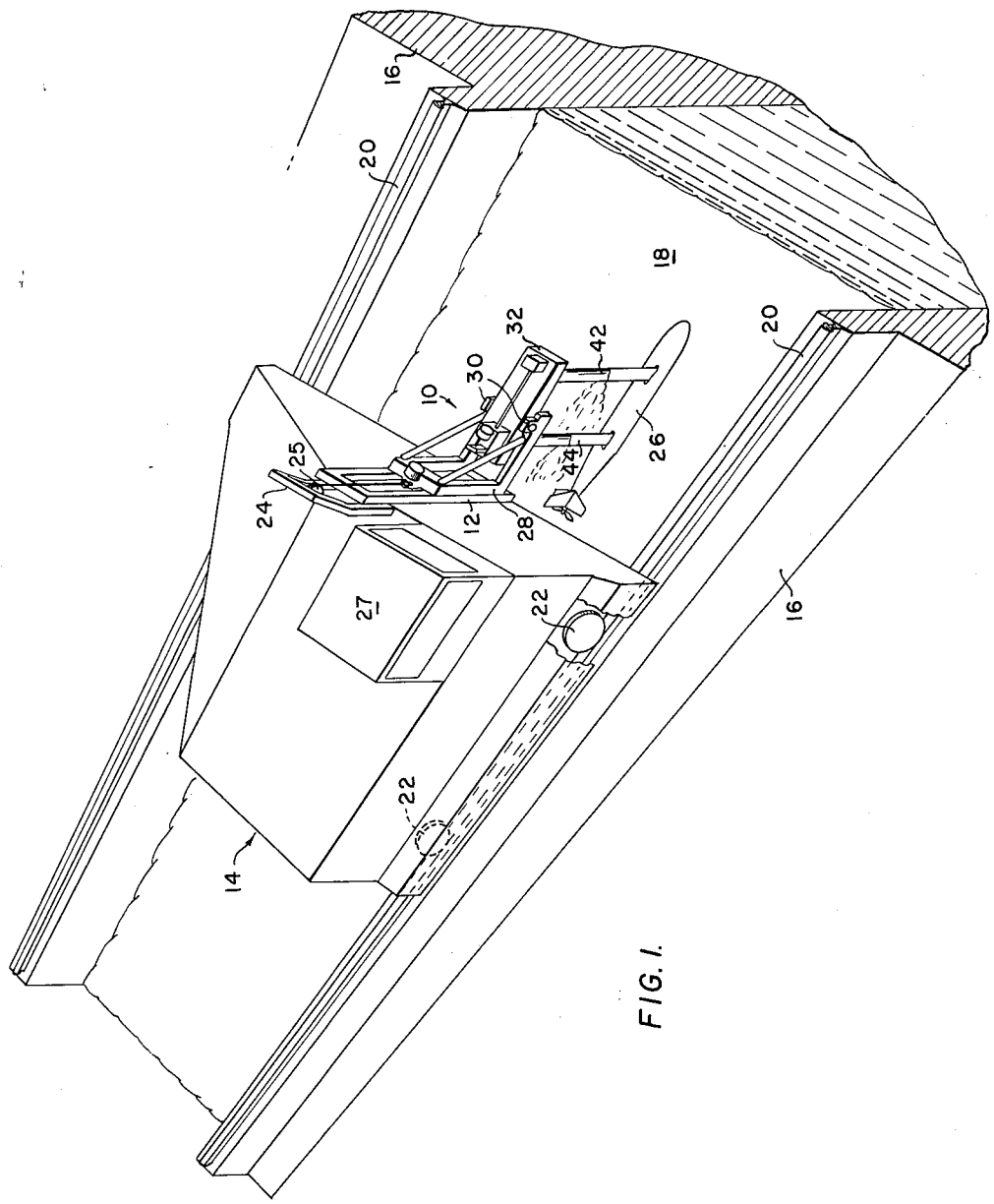
FIG. 1 is a perspective view of a planar motion mechanism mounted on a towing carriage, in accordance with the invention, the model being mounted on two spaced struts of the mechanism.

The planar-motion-mechanism and system as it physically exists in its preferred form is described in detail subsequently. It is desirable, however, to consider first the principles underlying the operation of the mechanism so that the design concept can be generally understood. The system was designed primarily for obtaining hydrodynamic characteristics of deeply submerged bodies in either the vertical or horizontal planes of motion, It can be used as well to obtain vertical-plane characteristics for bodies operating near or on the water surface. In the interest of simplicity, however, the mode of operation applying to submerged bodies in the vertical plane will be used to describe the principles of the system.

The kind of motion for static coefficients is commonly used by wind tunnel and model basin facilities and, therefore, does not need to be explained in detail. The diagram in FIG. 2 schematically represents this type of motion. The components are given with respect to a body-axis system with the origin at the center of gravity, CG. The system produces this motion by using a towing carriage to tow the model in a straight path at constant velocity. Discrete pitch angles for each run are set by a tilt table which supports the model through a pair of twin towing struts. Control surface angles are also set discretely for each run. Forces are measured by internal balances at each of the two struts to obtain static forces and moments. In such a system, the towed model has a fixed attitude during towing.

The unique feature, which is an important distinction over the prior art, of the planar motion mechanism is its ability to impose controlled non-linear motions on the body while it is being linearly carried by the carriage so as to enable the explicit determination of the rotary and acceleration coefficients. Sinusoidal motions are imposed to the model at the point of attachment of each of the two towing struts while the model is being towed through the water by the carriage. The motions are phased in such a manner as to produce the desired conditions of hydrodynamically "pure heaving" and "pure pitching." It is possible also, if required for any reason, to produce various combinations of pitching and heaving. FIG. 3 illustrates various types of motions including (a) the type of motion usually associated with oscillators, (b) pure heaving, and (c) pure pitching. The latter two are the basic motions associated with the planar motion mechanism.

The oscillatory motion depicted by FIG. 3(a) is actually a combination of pure pitching and heaving motions. The CG is constrained to move in a straight path while the model, which oscillates in a see-saw fashion, assumes sinusoidally varying angles of attack and pitch angles. Since the model is subjected to both linear and angular accelerations, a mixture of static, rotary, and acceleration forces and moments results. It becomes necessary, therefore, to perform a similar oscillation about a second reference point. The two oscillation conditions together with the static tests provide data which can be used to separate the hydrodynamic coefficients. The solution of simultaneous equations involved in this process, however, could lead to errors because of the wide differences in magnitude between the various individual coefficients.

This oscillator type of motion of the prior art may also be produced by the planar motion mechanism of the invention when the two struts move sinusoidally at 180 degrees out of phase with each other.

The pure heaving motion obtained with the invention and shown in FIG. 3(b) is obtained when both struts move vertically sinusoidally in phase with each other. This results in a motion whereby the model CG moves in a sinusoidal path while the pitch angle $\theta$ remains zero.

The pure pitching motion obtained with the invention and shown in FIG. 3(c) is obtained by moving both struts out of phase with each other; the phase angle between struts may also be dependent upon frequency of oscillation, forward speed, and distance of each strut from CG. The relationship is as follows:

$$\cos \phi_s = \frac{1 - \left(\frac{\omega x}{U}\right)^2}{1 + \left(\frac{\omega x}{U}\right)^2}$$

where:

$\phi_s$ is the phase angle between struts,
$\omega$ is the frequency of oscillation,
$x$ is the distance of each strut from the CG, and
$U$ is the forward speed of the model.

The resulting motion is one in which the model CG moves in a sinusoidal path with the model axis tangent to the path (angle of attack $a=0$).

Figure 4:
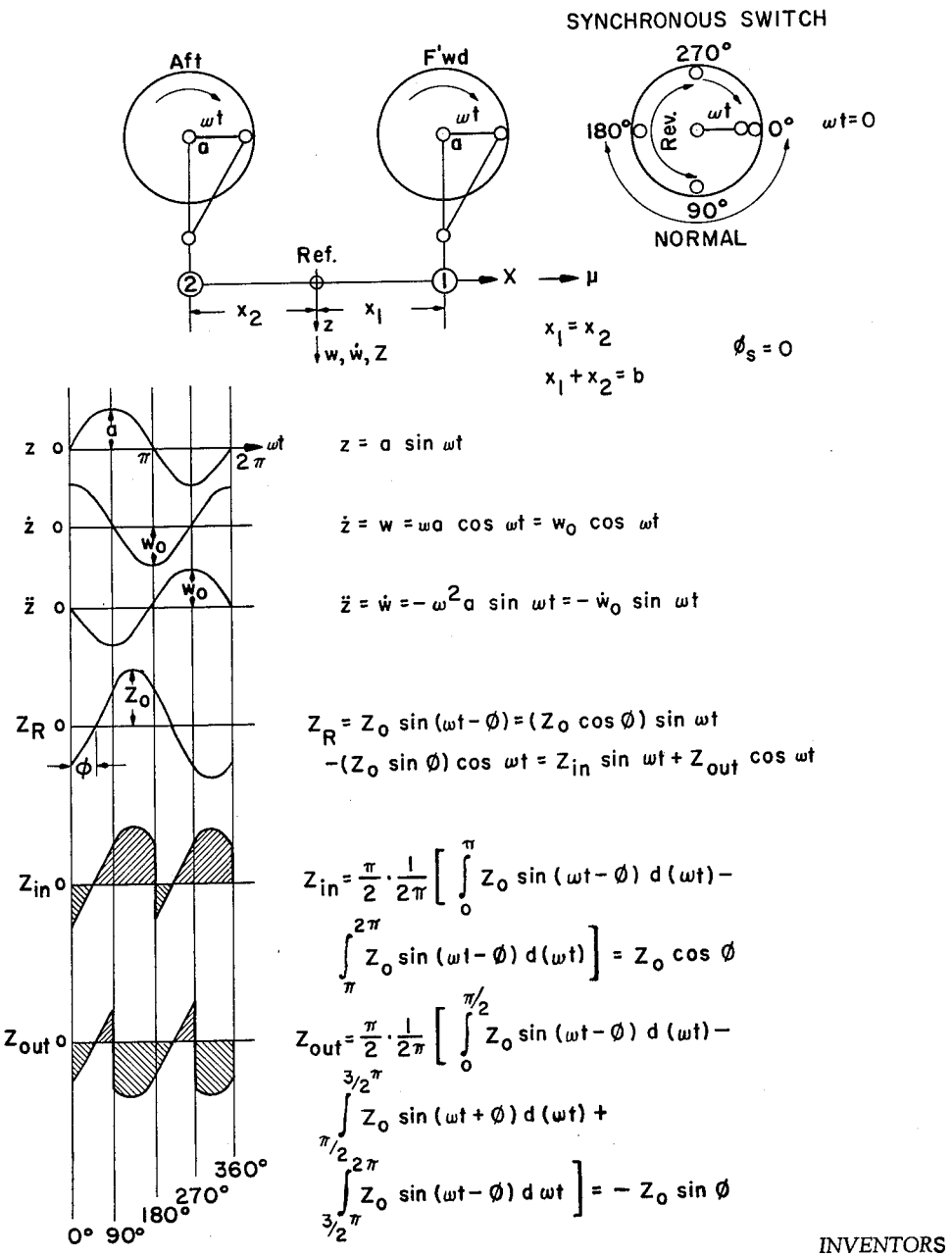
FIG. 4 is a chart useful in an analysis for pure heaving motion.

The process for obtaining translatory acceleration derivatives from pure heaving tests is represented diagrammatically in FIG. 4. The diagrams across the top of the figure show the motions of the aft and forward struts with respect to each other. Corresponding positions of a synchronous switch, provided with the electrical system to rectify the sinusoidal signals from the force balances, are also shown. At the left is a column of graphs showing the resulting motions and forces at the CG. The right-hand column contains the mathematical relationships represented by each graph. Descending from the top of FIG. 4, there is the vertical displacement $z$ curve, the associated velocity $\dot{z}$ curve, the associated acceleration $\ddot{z}$ curve, and then the vertical force $Z_R$ curve. It may be noted that the $Z_R$ curve is displaced in point of time from the $z$ curve by phase angle $\phi$. Thus $Z_R$ can be considered as being made up of two components, one in phase with the motion at the CG, $Z_{in}$, and the other in quadrature with the motion at the CG, $Z_{out}$. The shaded area per cycle under each curve represents the magnitudes of $Z_{in}$, and $Z_{out}$, respectively.

The in-phase component of force is directly related to the linear acceleration and, therefore, can be used to compute explicitly the associated acceleration derivatives. For example, the nondimensional acceleration derivative $Z_w{}'$ which defines the added mass can be obtained as follows:

$$Z_{\dot{w}}' = \frac{\partial[(Z_1')_{in} + (Z_2')_{in}]}{\partial \dot{w}_0} + m_m'$$

where:

$(Z_1)_{in}$ and $(Z_2)_{in}$ are in the in-phase components at each strut of the resultant force $Z_R$,
$\dot{w}_0$ is the amplitude of the linear acceleration, and
$m_m'$ is the mass of the model.

The process for obtaining rotary and angular acceleration derivatives from pure pitching tests is represented diagrammatically in FIG. 5. The order followed is similar to that shown in FIG. 3. In this case, the pitch angle traces ($\theta$, $\dot{\theta}$, and $\ddot{\theta}$) are of primary interest. The $Z_R$ curve is displaced in point of time from the $\theta$ curve by phase angle $\phi$. The procedure for resolving the resultant force into in-phase and quadrature components is similar to that for the pure heaving case. The shaded area per cycle under each curve represents the magnitudes of $Z_{in}$ and $Z_{out}$, respectively.

In the pure pitching case, the in-phase component of force is directly related to the angular acceleration and the quadrature component is directly related to the angular velocity. Thus both the angular acceleration and rotary derivatives can be computed explicitly. For example, the nondimensional rotary derivative $Z_q'$ can be obtained as follows:

$$Z_q' = \frac{\partial[(Z_1')_{out} + (Z_2')_{out}]}{\partial q_0'} - m_m'$$

where:

$(Z_1)_{out}$ and $(Z_2)_{out}$ are the quadrature components at each strut of the resultant force $Z_R$ and,
$q_0$ is the amplitude of the angular velocity.

The force components are measured separately at each of the two struts for both the heaving and pure pitching cases. Since the struts are equidistant from the model CG, all of the various moment derivatives associated with the oscillations are also obtained explicitly.

Referring now to FIG. 1 and FIGS. 6–22 of the drawings, wherein like reference characters designate like or corresponding parts throughout the several views, there is shown in FIG. 1, which illustrates a preferred embodiment, the planar motion mechanism 10 slidably mounted on a carriage bracket 12 attached to a towing carriage 14.

The planar motion mechanism 10 is shown in the operating position mounted on the carriage bracket 12 which is part of the towing carriage 14. The carriage 14 is supported above a model basin 16 containing water 18 and having a pair of rails 20. A constant speed drive motor (not shown) drives wheels 22 on rails 20 and thereby the carriage 14.

A stand 24 supports a winch 25 which comprises a part of an adjusting means for adjusting the mechanism 10 up and down on bracket 12 so that the centerline of a model or body 26 is at a desired distance below the surface of the water 18, in this case 10 feet. An instrumentation penthouse 27 mounted on top of carriage 14 contains the recording and control equipment for the planar motion mechanism 10.

Figure 6:
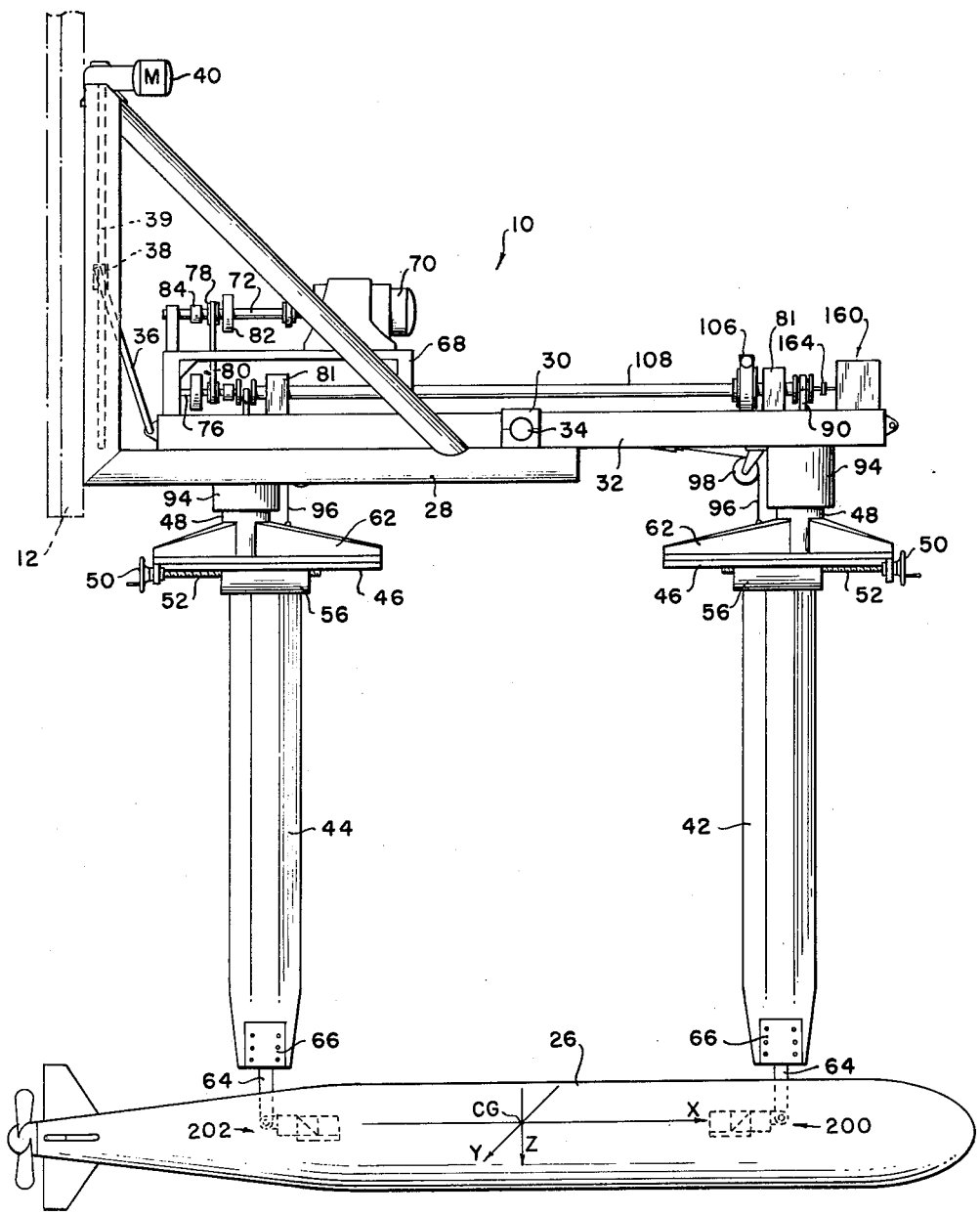
FIG. 6 is a side elevational view of the planar motion mechanism with a submarine model attached to the struts of the mechanism.

Referring to FIG. 6, the model 26 center of gravity is indicated by point CG halfway between the two struts which support it. In accordance with "Nomenclature for Treating the Motion of a Submerged Body Through a Fluid" Technical and Research Bulletin No. 1–5, published April, 1950 by the Society of Naval Architects and Marine Engineers, 29 West 39th St., New York 18, N. Y., p. 6, the body axes in the X direction (forward), Y direction (starboard) and Z direction (vertically downwards) are indicated by arrows through CG.

As shown in more detail in FIG. 1, the mechanism 10 comprises a support frame 28 which slides vertically on carriage bracket 12 and supports a split-clamp trunnion bearing 30. A rectangular tilt table 32 has a bearing tube 34 which is supported by bearing 30 and which extends transversely across the table.

The tilt table 32 is tilted at one end by a tilting means comprising a link 36 attached to a ball bearing screw jack 38 and threaded shaft 39 driven by a ⅓ H.P. electric motor 40. Motor 40 is equipped with a brake to prevent coasting and is started and stopped by a command switch in the penthouse 27 and a system of micro-switches installed on the support bracket 28 and operated by a roller on screw jack 38. In this manner, discrete angles of the tilt table can be commanded from a remote station in one degrees steps over a range of ±20 degrees. Struts 42 and 44 are carried by the tilt table 32.

A twin strut system, 42 and 44, was adopted as the method of towing submerged models. This decision was reached on the basis of thorough studies of the towing problem including hydrodynamic, structural, and handling aspects. In the design of strut systems for towing bodies that are apt to be unstable, the torsional rigidity of the system must be made to exceed the anticipated static-moment rate of the model in yaw, pitch, and roll. The torsional rigidity of a twin strut system in pitch and yaw can be made greater by increasing the spacing between the points of attachment of the struts. Thus for equal torsional rigidity, a much larger section is required for a single strut than for one of the twin struts.

It is of utmost importance to make the size of the struts mall in proximity to the model in order to minimize strut interference effects. Consequently, the twin strut system is at a decided advantage in this respect. Also, it is more feasible to make a twin-strut system stiff enough so that the angles set at the unloaded condition will remain essentially the same while the model is being towed at maximum speed and high angles of attack.

Referring to FIGS. 6 and 7, the spaced model-supporting struts 42 and 44 are slidably mounted in the tilt table 32 so that they may be oscillated only in the vertical direction or perpendicular to the tilt table 32, if the table is tilted, to provide the proper planar motion. The forward strut 42 and aft strut 44 are attached by clamps 46 to piston means including pistons 48. A hand operated crank 50 and worm screw 52 for each strut independently move the struts along the X axis to a position depending upon the model size and its CG.

As shown in more detail in FIG. 8, the upper part of each strut, 42 and 44, is welded to a clamped base 54 and a shroud 56 for transverse stiffness. The piston 48 has projections which extend down to clamping plate 58 which has a pair of clamps 46 bolted thereto by bolts 60 to slidably support the clamped base 54. A plurality of stiffeners 62 are welded between the piston 48 and the clamping plate 58.

The struts 42 and 44 have streamlined sections to minimize drag and interference effects on the model.

Referring to FIG. 6, the lower part 64 of the struts is deliberately made as small as possible to minimize interference effects on the model. In the preferred embodiment, lower part 64 has an ogival section 3 inches on chord (X direction) and 1⅛ inches thick. Part 64 is clamped in the transition section 66 of the strut and has a disk shaped pad at the lower end to permit attachment to the dynamometry located in the model. In order to facilitate passage of electrical cables through the strut in this preferred embodiment, about 1¾ inches of part 64 just above the pad is opened up to a U-shape.

In addition to the use of small strut sections in proximity to the model, the method of setting hull angles also strongly minimizes strut interference effects. When an angle is set on the model, the struts rotate in the vertical center plane and thus maintain a zero angle of attack with respect to the flow. The interference effect is largely due to lift induced on the hull by the struts and since the struts remain at zero angle of attack, this type of interference effect is not present. It has been found that the interference effects on lift and moment with this strut system are small enough to be neglected for models as small as 9 feet in length. The effects on drag which are due primarily to the wake left by the struts are negligible.

Referring to FIG. 1 and FIG. 6, the forced motion of the model is obtained by driving the struts 42 and 44 up and down in the vertical plane while moving the model 26 through the water 18 in the basin 16 by means of the carriage 14.

A preferred oscillatory forced-motion drive mechanism for supplying the oscillating motion to the struts is shown in more detail in FIG. 7 where a motor platform 68, mounted on the tilt table 32, supports a 1 H.P. electric motor 70 containing a planetary gear, speed reducer of 85 to 1 so that the motor output shaft 72 rotates at 20 r.p.m. The motor power is transferred to the main drive shaft 76 by two geared pulleys 78 and a Gilmer timing belt 80. Pulleys 78 are of the same size so that the drive shaft 76 normally rotates at the same speed as the motor output shaft 72. Split sleeve bearing supports 81 mounted on table 32 support shaft 76 and divide it into a central portion 108 and end portions 120.

There are cases where it is desirable to have the drive mechanism supply more than one oscillation frequency. For example, such a feature is helpful in standstill runs or where it is not feasible to cover a broad enough range by varying the speed of the carriage 14. It is also helpful when the technique is used to obtain the moment of inertia of the model in air.

As shown in FIG. 7, large pulleys 82 are mounted on the output and drive shafts opposite small pulleys 84 next to geared pulleys 78 so that, by moving belt 80 to a corresponding pair of pulleys, drive shaft 76 may be driven at ½, 1, and 1½ times the speed of the output shaft 72. In the preferred embodiment, strut oscillation frequencies of about 1.1, 2.2, and 3.3 radians per second are thus provided.

A simple and reliable cross crank arm 86 is mounted between flanges 99 on each shaft portion 120 of the drive shaft 76 above the struts 42 and 44. Connecting rod 90 is attached to the crank arm 86 and to shaft 92 forming part of piston 48. Sleeves 93 center rod 90 on shaft 92.

In the actual embodiment referred to, crank arm 86 has a one inch eccentricity from main shaft 76 and connecting rod 90 has a length between arm 86 and shaft 92 centers of 17⅛ inches. The resulting motion of the piston 48 is within 1.5 degrees of being a true sinusoid and no appreciable error was introduced by assuming that the motion is sinusoidal.

Piston 48 is constrained within cylinder 94 which is attached to tilt table 32 so that the motion of the struts 42 and 44 is vertical or perpendicular to the tilt table 32. Centering pin 95 may be temporarily inserted through holes in cylinder 94 and piston 48 as a temporary lock while making adjustments. The detail view in FIG. 7 is for forward strut 42 with aft strut 44 having a similar crank arm system.

In addition to overcoming hydrodynamic loads, the drive-motor 70 of the forced-motion mechanism must raise and lower the unsupported deadweight load of the moving parts of the system. Assuming a neutrally buoyant model, this load is caused by the weight of connecting rods, pistons, strut supports, struts, and part of the gage assemblies. The deadweight would normally impose a sinusoidal load on the drive-motor of considerably greater amplitude than the maximum hydrodynamic load anticipated. Consequently, the use of systems of counterbalancing was investigated. Counterbalancing weights were discarded for two reasons; first, the weights would substantially increase the total weight of the system to be cantilevered on the support frame 28 and secondly, there would be problems of restraining the weights from swinging to avoid inertial effects.

The counterbalancing system devised is shown in FIG. 7 where a cable 96 attached to one of the stiffeners 62 runs over a pulley 98 and through adjusting turnbuckle 97 to the center of a shaft 100 which moves horizontally in a slide 102. Eight Flexator springs 104 are connected in parallel between shaft 100 and shaft 105 which is attached to tilt table 32.

A Flexator is a type of spring which exerts nearly constant tension over its design range of deflections. The system shown in FIG. 7 is attached to the forward strut 42 and is matched by a similar system attached to the aft strut 44.

Each of the springs 104 has a capacity of 50 pounds so that the two-strut system counterbalances 800 pounds but weights only 50 pounds itself.

The type of motion imparted to the model, whether it is pure heaving, pure pitching, or some combination of the two, depends upon the phase relationship between the motion of the two struts. The phase angle is established by the phase changer 106 which functions as a part of drive shaft 76 near forward strut 42.

Figure 9:
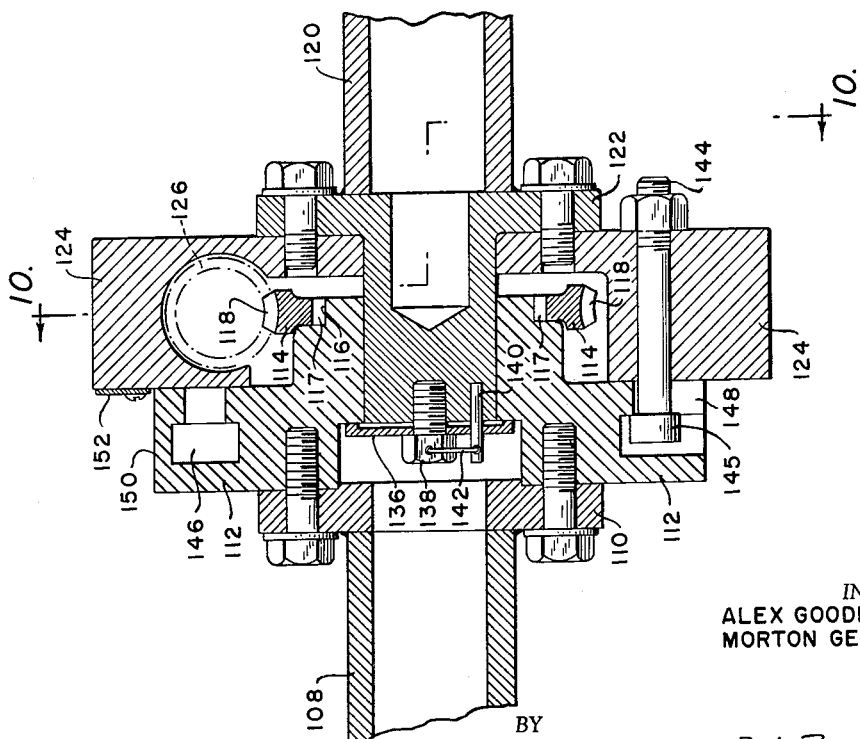
FIG. 9 is a side view, in cross-section, of a phase changer of the mechanism.

Referring to FIG. 9 for a cross-section view of the phase changer 106, the central section 108 of drive shaft 76 is welded to flange 110 which is bolted to gear mount 112. Gear mount 112 has a gear 114 force fitted on inner shoulder 116 and locked against rotation by keys 117. The gear teeth 118 face radially away from the center line of the drive shaft 76.

The forward section 120 of drive shaft 76 is welded to worm flange 122 which is bolted to worm housing 124.

Figure 10:
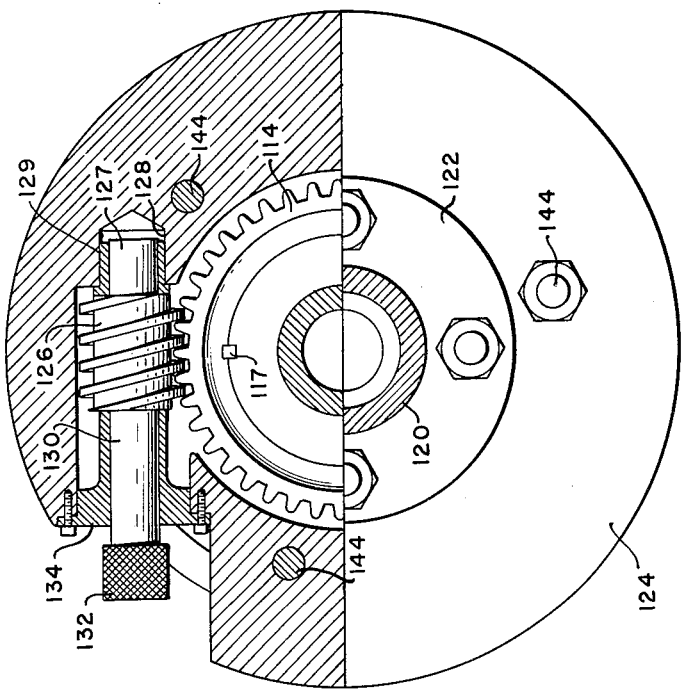
FIG. 10 is an end view, partly in elevation and partly in cross-section taken along line 10—10 of FIG. 9, of the phase changer.

FIG. 10 is a view taken on lines 10—10 of FIG. 9 and shows the worm 126 with a shaft end 127 rotatably mounted in recess 128 having bushing 129 in worm housing 124 and with the other end comprising a handle shaft 130 and a handle 132. A bushing 134 screwed to the worm housing 124 supports the handle shaft 130 so that worm 126 engages gear 114.

Referring again to FIG. 9, a secure plate 136 is attached to worm flange 122 by screw 138 to keep gear mount 112 pressed against worm housing 124 during assembly. A tie pin 140 and safety wire 142 keep screw 138 from rotating which might allow secure plate 136 to drop off during operation.

Three bolts 144 have their heads 145 inserted in chamber 146 through slot 148 in gear mount 112 and extend through worm housing 124 to clamp gear mount 112 and worm housing 124 together during operation.

The outer surface 150 of gear mount 112 is graduated from 0° to 359° in units of 1° and cooperates with index 152 on worm housing 124. Index 152 has a vernier for setting 0.1 degree angles.

A phase change is made by loosening bolts 144, operating worm 126 by handle 132 until the desired angle is set between the forward and aft strut crank arms 86 as indicated by index 152, and tightening bolts 144 to preserve the new setting.

The end results sought in the oscillation tests are the separate force and moment components which are either in phase or in quadrature with the input motions. To accomplish this objective directly, an electrical system which resolves the sinusoidal signals coming from the force balances into in-phase and quadrature components is made part of the test equipment. The "brain" of the resolving system is the synchronous switch assembly 160 shown in FIGS. 11 and 12 which simultaneously selects either the in-phase or quadrature parts of the signals coming from all of the force balances.

Referring to FIG. 11, the synchronous switch assembly 160 (shown without the dust cover indicated in FIGS. 6 and 7) is driven by shaft 162 connected by an Oldham coupling 164 to an extension 165 of drive shaft 76 forward of flanges 88 above forward strut 42. A base 166 mounted on tilt table 132 is adjusted in height by shim 168 and supports two shaft hangers 170 having ball bearings (not shown) for supporting shaft 162.

FIG. 11 shows a cross-section view of the central portion of the switch assembly 160, where a drum 172 is clamped by a split sleeve 174 and screw 176 to shaft 162. A drum dial 178 is fastened to drum 172 and has degree markings from 0 to 359 degrees in steps of one degree. Vernier dial 180 attached to vertical mount 181 has an index mark and a vernier scale for setting 0.1 degree increments.

Referring also to FIG. 12, four micro-switches 182 are fastened to sliding plates 184 having slots 186. Sliding plates 184 are mounted on pads 188 attached to the vertical mount 181. A threaded sweeper pin 190 having a rounded tip 192 is fastened to drum 172 and locked by lock nut 194.

The four micro-switches 182 are set so that the sweeper pin 190 moves the roller-tipped operating arm 196 to operate the micro-switches at exactly 0, 90, 180, and 270 degrees around the axis of shaft 162.

As with the phase-changer 106, the setting of the synchronous switch must be altered to conform to the kind of motion being produced. For pure heaving, the procedure is straightforward. The pistons 48 are set in mid-position corresponding to a setting of zero on the phase-changer. The centering pins 95 are inserted through the cylinders 48 to hold alignment. Then, by releasing, rotating, and tightening the sleeve 174, the sweeper pin 190 of the synchronous switch is set to zero position as indicated on the drum 172 scale. For each condition of pure pitching, it is necessary to reset the sweeper pin 190 to a new position. There are various techniques for doing this, but each amounts to indexing the drum 172 on the synchronous switch to one-half the angle set on the phase-changer 106.

The dynamometry is composed of two systems of gages designed to measure forces and moments in six degrees of freedom. The gage systems 200 and 202 are installed within the test model as shown in FIG. 6. An internal gage system was chosen in preference to the external types which are commonly used in similar wind-tunnel applications for the following reasons:

(1) It eliminates the need for strut-tare corrections or, in the alternative, housing the towing struts within fairing. The latter technique is undesirable since it tends to increase the overall section size of the strut in proximity to the model and thus aggravates the problem of minimizing strut interference effects.

(2) The balances are fixed to and rotate with the model so that the forces and moments are always measured with respect to the body axes. This is considered to be the preferred end result for analysis of the coefficients in the equations of motion.

The major components of the system are the modular force gages and the roll gages. The individual components and how they are assembled within the model to operate as a system are discussed in order.

A modular type of gage was adopted as the basis for providing a force and moment measurement system which is free of interactions both mechanical and electrical. It is well known that other types of flexural multi-component balances suffer from mechanical interactions, that is, indirect loads affect the strains or deflections that are being measured. Attempts are made, with varying degrees of success, to mask this effect by arrangement of electrical transducers. A typical technique is the use of rosettes with bonded wire-resistance strain gages. Interactions are particularly objectionable for two reasons:

(1) They affect the accuracy of a system especially where the combined loads are large compared with the direct load being measured.

(2) They require the use of matrix-type calibrations. This requirement adds greatly to test preparation and data reduction time and is also cumbersome during testing where essentially end results are desired for plotting and checking purposes.

The modular force gage 204 used with the system is showns in FIGS. 13, 14 and 15. It is cube-shaped, 4.000 inches on edge and machined out of a solid block of stainless steel.

Referring to FIG. 13, modular force gage 204 has three pairs of faces of different types, designated as flexure face 206, mounting surfaces 208 comprising plates, and open ends 210, respectively. In the preferred embodiments herein described, each flexural face 206 has two flexures 212, 2.500 inches long, 0.186 inch thick, and 1.00 inch wide. This means that for a 4 inch block, each of the plates 208 is ¾-inch thick and relatively stiff as compared to the flexures. A 2.0 x 2.5-inch rectangular opening 214 allows access to the transducer within the gage.

Each mounting surface 208 has 4 holes 216, one at each corner, which are tapped to receive ⅜-inch bolts and 2 holes 218 arranged near opposite edges on one centerline which are drilled and reamed to receive ¼-inch aligning pins. Both mounting surfaces 208 are identical except that the one shown in FIG. 13 contains an additional hole 220 to be used with a stop 224.

The open ends 210 of the gages are made up of the thickness of the flexures 212 and mounting surfaces 208. The dimensions of all gage units are made identical to provide interchangeability.

The inside of the gage is formed by machining away as little material from the cube as practical. This was done to retain simplicity and to allow for very rigid support members. The two major parts within the gage block are the pedestals which support and maintain the relative position of the transducer coil and core.

Referring also to FIGS. 14 and 15, the coil pedestal 222 is an unusually stiff member which is an integral part and moves with lower mounting surface 208. Upper mounting surface 208 holds a 1⅛-inch diameter cylindrical stop 224 which passes through the upper mounting surface 208 and extends within coil pedestal stop hole 225. The stop 224 limits the amount of gage travel and thus guards against overload of the flexures. The stop 224 has a clearance within coil pedestal stop hole 225 of 0.031 inch in diameter.

The core pedestal 226 is also rigid and is part of the upper mounting surface 208 which moves opposite to that for the coil.

A transducer unit similar to a Differential Transformer Pickup Unit, Patent No. 2,494,579, issued January 17, 1950, by J. R. Pimlott et al., has a housing 230 supported in the coil pedestal 222 and fastened with retainer nut 232. A coil 234 having two equal windings is mounted in housing 230. A magnetic core 236 is slidably supported in the housing 230 and by a threaded shaft 238, which is engaged with threaded hole 240 in the core pedestal 226 to provide screw adjustment of the core 236 relative to the coil 234. A lock nut 242 holds the core in place after adjustment is made. With the foregoing arrangement, the gage 204 senses the deflection of the flexures 212 as a parallel movement of one mounting surface 208 relative to the other. The movement is equated to load on the basis of a static calibration with weights.

The spring constant of the flexure gage 204 was chosen high enough to obtain a natural frequency which would not result in magnification of oscillatory forces due to either carriage vibrations or forced-mechanism motions yet low enough to obtain good sensitivity and resolution. The natural frequency with a 2000-pound model attached is about 30 cycles per second for each gage 204 compared with a maximum frequency of 0.5 cycle per second for the forced motion mechanism. It is apparent, therefore, that the static calibration applies with rigor to the oscillatory forces measured.

The flexure gages are exceedingly stiff with respect to forces and couples normal to the mounting surfaces 208 and open ends 210. The only possible source of mechanical interaction, therefore, would be a large force exerted at the center of the mounting surfaces 208 while the flexures 212 are inclined. The movement of the flexures 212 has been kept down to 0.01 inch for a direct load of 500 pounds. Consequently, an indirect load of 500 pounds would cause an interaction of about 0.05 percent, which is less than can be detected with most existing calibration devices.

The electrical signal coming from the gage 204 changes when the core 236 is displaced axially relative to the coil 234 because of changes in length of the air gaps between housing 230 and core 236. The sensitivity as well as the range of linearity of the transducer is governed by the ratio of maximum core movement to length of air gap. This ratio is usually predetermined on basis of maximum deflection and attendant maximum load anticipated for the gages. The cores presently installed within the transducers were selected to give optimum characteristics over a range of ±0.004 inch.

In a preferred embodiment the modular force gages 204 were made of 17–4PH stainless steel made by Armco Steel Corporation. This material was selected for its excellent flexural properties, its corrosion resistance, and because it can be finished machined and heat-treated without distortion or warpage. It has practically zero mechanical hysteresis; within the accuracy of measurement, the load-deflection curve is the same in both loading and unloading.

The modular force gages 204 provide the means for measuring all required forces and moments except roll moment. Separate gages to measure roll moment are needed, therefore, to complete the system. The transverse sections at the point of strut attachment on most models were not large enough to accommodate an offset modular force gage. Consequently, a different type of gage is provided for this purpose.

The roll gage 250, shown in FIG. 16 is designed to measure pure torque about one axis in contrast to the modular gages which measure one component of pure force. It is not affected by the forces and moments exerted in other directions.

Referring to FIG. 16, the shaft assembly 252 has a flange 254 having holes 256 for attachment to a force gage 204, a flexure element 258, an armature 260 mounted around the flexural element 258, a pinned extension shaft 262, and a coil 263 around the flexural element 258.

For the preferred embodiment, the flexural element 258 includes two flexural sections 264 which are 1.125 inches long and 1.2 inches in diameter. The shaft assembly 252 except for the armature 260 and roll pins, is made of a Monel metal, such as K-Monel, because of its low mechanical hysteresis and non-magnetic properties. To maintain reasonable stiffness in roll, the torsional spring constant was selected as 650 pound-feet to produce a twist angle of 30 minutes.

The armature 260 is made of magnetic stainless steel and is a tubular section fastened by stainless steel roll pins 266 to flexural element 258.

Referring to FIG. 17, which is a development view, the armature 260 comprises a central ring 268 and two outer rings 270 and 272 having transversely extending fingers 273 separated by narrow (.010 in.) air gaps 274 which extend transversely to the flexural element 258. The rings are held in this relative position by roll pins 266 in holes 276.

When a roll moment around the X axis is applied to the shaft assembly 252, the deflection of the flexural element 258 will result in a relative movement of the outer rings 270 and 272 with respect to the central ring 268. This relative movement, such as indicated by arrows 278 on FIG. 17, will tend to open the air gaps 274 between central ring 268 and ring 270 and to close the air gap 274 between central ring 268 and ring 272. This differential change in the air gaps 274 changes the magnetic path through the armature 260 and varies the impedance of coil 263.

Referring to FIG. 16, the coil 263 is like coil 234 as used in force gage 204. Coil 263 is molded in a casting resin to protecting sleeves 280, end plate 281, and to cylinder 282, which is pinned by pin 284 to shaft assembly 252.

Extension shaft 262 is pinned by taper pins 286 to assembly shaft housing 288.

FIG. 18 which is a cross-sectional view on lines 18—18 of FIG. 16 shows the detail of the gimbal indicated by numeral 283. Assembly shaft housing 288 is rotatably attached to trunnions 290 by ball bearings 292 so that the shaft assembly 252 may pitch freely around the Y axis. Trunnions 290 are fastened to yoke 294 which is rotatably mounted on spindle 296 by ball bearings 298 so that free rotation about the Z axis is allowed. Rotation about the X axis is restrained and the torque is measured by the roll gage 250. Spindle 296 is bolted to pad 299 which is welded to the lower part 64 of strut 42.

The gage assembly 200 at the forward strut 42 can be examined more closely in FIG. 19. The model 26 is equipped with a bedplate 300 to receive the gage assembly 200. The first force gage 302 is bolted to the bedplate 300, its flexures face the X-direction so that it measures the X-forces. The opposite mounting surface of the first gage 302 is bolted by a channeled plate 304 to one mounting surface of a second gage 306 whose flexures face the Y-direction so that, it measures the Y-forces. The other mounting surface of the Y-force gage 306 is bolted by a gussetted angle bracket 308 to a third gage 310 whose flexures face the Z-direction so that it measures Z-forces. The remaining mounting surface of the Z-force gage 310 is bolted to the flange 254 of the roll gage 250 which is connected through the gimbal 283 to the towing strut pad 299. Thus, starting at the model, the order followed in the chain of gages is: X-force, Y-force, Z-force, and roll moment.

It is convenient to resort to the analogy of a simply supported beam to explain how forces and moments are determined with the foregoing arrangement. Taking for example motions in the vertical plane with the forces at each of the gimbal centers, the moment about each of these centers is zero. The reaction Z-forces are measured by the gages and their vector sum is equal to the total Z-force. These reaction forces are then resolved with respect to the CG to obtain pitching moment. Because of the symmetry of the struts with respect to the CG, the pitching moment is the vector difference between the reaction Z-forces times the distance form one gimbal center to the CG. The total X-force exerted on the model is also experienced as reaction X-forces which are measured by the gages at each of the two gimbal centers. The vector sum of the reaction X-forces is equal to the total X-force, but, since the reaction X-forces are aligned with the axis, there is no contribution to pitching moment.

The same technique is used to obtain the forces and moments in the horizontal plane leaving only the roll moment to be determined. The total roll moment is equal to the sum of the reaction roll moments which are measured by the roll gage at each strut.

It may be noted that it is possible to eliminate one roll gage and one X-gage and yet measure all required forces and moments. To do so, a gimbal with three degrees of freedom and a slider which permits movement along the X-axis are installed at one strut. This allows the entire roll moment and X-force to be taken on one roll gage and one X-gage, respectively. It was considered desirable, however, to have a closed elastic system and thus avoid problems of friction and lost motion which have harassed some of the earlier two-strut systems.

Referring to FIG. 20, the aft strut gage system 202 is shown in detail having an aft bedplate 314 attached to model 26, X-gage 316, Y-gage 318, Z gage 320, gimbal 322 and swivel 324. The XYZ gages are mounted on brackets as in forward gage system 200 on FIG. 19.

Gimbal 322 has a flange 326 fastened to the Z gages 320, cylindrical housing 328 welded to flange 326, and cover plate 330 fastened to housing 328. Ball bearings 332 mounted in housing 328 rotatably support a trunnion 334 having a circular bearing surface 336 for supporting a spherical bearing 338. Nut 340 fastens circular bearing surface 336 in trunnion 334.

Spherical bearing 338 is mounted on aft spindle 344 and held by nut 346, which is locked by a cotter pin through hole 348. Flange 350 on spindle 344 is bolted to the swivel 324 comprising swivel arm 352 and bearing 354 having flange 356 attached to pad 358 on the lower part 64 of aft strut 44.

Spindle 344 and swivel arm 352 swing on bearing 354 and in spherical bearing 338 in the XZ plane to provide movement of the model at the aft strut 44 along the X axis. The spherical bearing 338 allows the model to roll around the X axis. Ball bearings 332 around trunnion 334 were installed to minimize this sliding friction and change it to rolling friction so that roll gage 250 at forward strut 42 will fully restrain the tendency to roll and therefore accurately measure the roll moment.

The planar motion mechanism provides a means for forcing rotary motion about the center of gravity for determining the rotary coefficients directly for rotation about the model Y-axis (pitch) and, by rotating the model 90° around the X-axis and making another pitching test, the rotary coefficients for rotation about the model Z-axis (yaw) may be determined.

In order to determine the rotary coefficients directly for rotation about the X-axis (roll) of the model, a roll oscillator 360, see FIG. 21, is mounted on forward or aft strut 42 or 44 and extends down to a modified roll gage 370. A bearing having three degrees of freedom of movement is installed at the strut that does not have the roll oscillator. Bracket 361 supports a motor 362 forward of strut 42 or 44. Crank arm 363 attached to the shaft of motor 362 has a ⅛ inch eccentricity and slides in Scotch yoke 364 to drive a removable roll oscillator shaft 365 vertically in a sinusoidal motion. Roll oscillator shaft 365 slides vertically in linear ball bearings 366 in the vertical center line of strut 42 or 44.

Referring to FIG. 22, which is an elevation view taken on lines 22—22 of FIG. 21, shaft 365 has elbow 367 locked thereto and drives lever 368 over an angle of about ±2.5°.

Referring again to FIG. 21, lever 368 oscillates the extended shaft 369 of a modified roll gage 370 and thereby the model. Modified roll gage 370 is similar to roll gage 250 shown in FIG. 16, except for the parts shown in cross-section in FIG. 21. Extended shaft 369 is similar to pinned shaft 262 except that it is longer in the forward direction and has lever 368 mounted on the end thereof. Modified sleeve 372 is similar to sleeve 230 except that it extends further forward and has space for mounting ball bearings 374.

Holes 376 in modified sleeve 372 and hole 378 in extended shaft 369 provide space for a removable taper pin 379 to lock sleeve 372 and shaft 369 together during a pitching or heaving test. Shaft 365 is also unlocked and removed during a pitch or heave test so as to completely free the roll gage gimbal.

During a roll test, the struts 42 and 44 are fixed in position by centering pins 95 (see FIG. 7), pin 379 is removed, and the roll oscillator motor 362 oscillates shaft 365 at about 0.2 c.p.s. to roll the model 26 sinusoidally through the ±2.5° angle while the roll and force gages measure the reaction forces.

Figure 23:
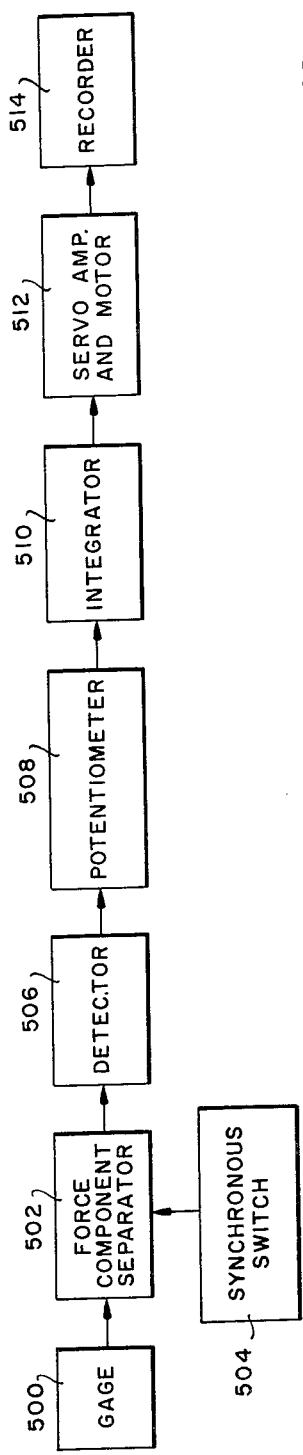
FIG. 23 is a block diagram of one channel of the integrator recording system including a force component separator.
Figure 24:
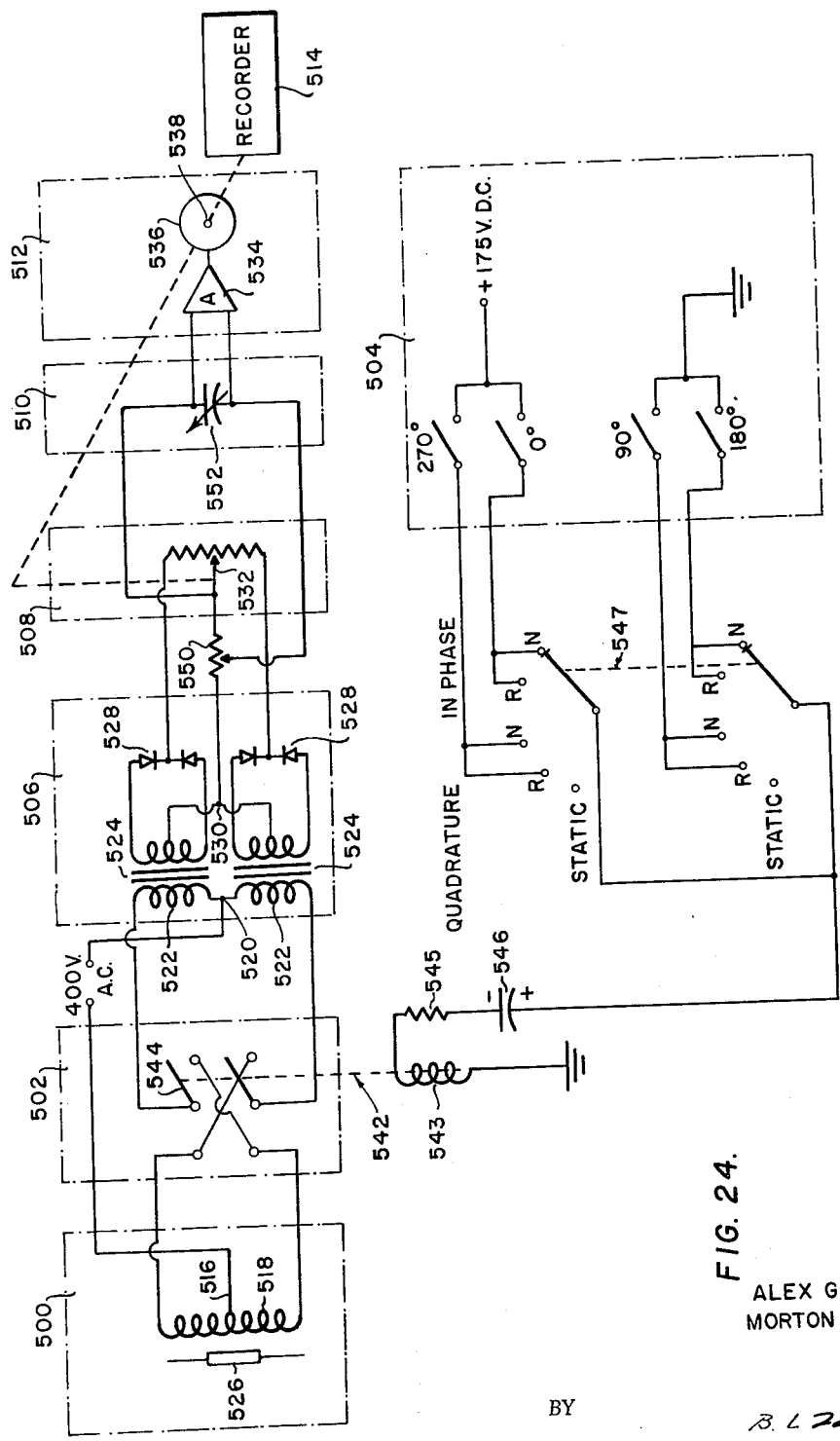
FIG. 24 is a schematic wiring diagram of the equipment of FIG. 23.

The recording systems for both oscillation and steady state tests are alike in many respects and therefore a preferred embodiment of the recording system for the oscillation tests is shown in FIGS. 23 and 24.

The planar motion mechanism as has been described embodies six force gages and one roll gage and therefore seven parallel channels (one for each gage) are used. FIG. 23 is a block diagram of a typical channel for one roll or force gage 500 comprising a Force Component Separator 502 which is energized by the Synchronous Switch 504, a Detector 506, a Potentiometer 508, and Integrator 510, a Servo Amplifier and Motor 512, and a Brown Recorder 514.

Referring to FIG. 24 for the schematic diagram of FIG. 23, a 4.5 volt, 400 cycle A.C. voltage is applied to the center tap 516 of coil 518 of gage 500 and to the common connection 520 between the primaries 522 of transformers 524 in Detector 506. The outer ends of the coil 518 and primaries 522 are connected together through Force Component Separator switch 544 to complete the circuit. When core 526 of gage 500 is moved away from the central position in its magnetic circuit, the impedance of each half of coil 518 changes equally and in a different direction which results in an unequal voltage across transformers 524.

The output voltage of transformers 524 is rectified by diodes 528 and applied to the feedback potentiometer 508 so that normally the voltage difference between common connection 530 of transformers 524 and arm 532 on potentiometer 508 is zero. The unequal A.C. voltage, due to the movement of core 526, on transformers 524 produces an unequal D.C. voltage across potentiometer 508 to thereby shift the zero point. The voltage difference between common connection 530 and arm 532 is amplified in chopper amplifier 534 and changed to a 60 cycle A.C. voltage to drive servo motor 536.

The shaft 538 of servo motor 536 then moves arm 532 of feedback potentiometer 508 to the new zero point and also moves the pen of the Brown recorder 514 to record the reading.

In order to resolve the gage 500 signal into in-phase and quadrature components as shown by FIGS. 3 and 4, the force component separator 502 is selectively operated by the synchronous switch 504.

As shown in FIG. 24, a polarized relay 542 has an operating coil 543 and contacts which are connected so as to form double pole, double throw switch 544. Coil 543 is connected by a charging circuit consisting of resistor 545 and capacitor 546 to selector switch 547.

A given position of the selector switch 547 connects the relay coil 543 to either the normally open 0° and 180° contacts for the in-phase component resolution, or to the normally open 90° and 270° contacts for the quadrature component resolution. These four contacts are the contacts of switches 182 of the synchronous switch assembly 160 of FIG. 11.

After the selector switch 547 setting is made, the relay 542 is operated by the given synchronous-switch pair to perform a rectification of the signal. For example, if an "in-normal" setting is made, as shown in FIG. 24, then the 0–180 degree pair of synchronous switches is electrically active. Every time the 0-degree switch is operated, the coil 543 in the relay 542 is energized to place switch 544 in one of its two positions. The signal from gage 500 then comes through with normal polarity to the recorder 514. At the same time a charge is built-up on capacitor 546 which is in series with the relay coil. Every time the 180-degree switch is operated capacitor 546 is discharged to ground which reverses relay 542 which reverses the gage 500 polarity.

The net effect of this alternate reversing at 0 and 180 degrees is a rectified signal which goes to the recorder 514. Since the synchronous switch 504 has been phased-in with the planar motion by adjusting both the phase-changer 106 and synchronous switch assembly 160 on the forced-motion mechanism, the rectification is in synchronism with the motion.

If steady state tests are made or if it is not desired to resolve the gage output, selector switch 547 is connected to the static position to de-energize relay 542 and leave switch 544 in one of its two positions.

A span potentiometer 550 is connected between arm 532 on feedback potentiometer 508 and common connection 530 to adjust the sensitivity of the recording circuit to the particular roll or force gage that it is connected to.

The integrator 510 is a 1000 to 8000 micro-farad variable capacitor 552 connected across the input to the servo amplifier 534.

For any particular test, the capacitor 552 is chosen on the basis of the minimum amount of capacitance required to give the desired smoothing. In this way, the time required to obtain a complete run is minimized. Since the integration or filtering is done with capacitance changes rather than resistance changes, there is no attenuation of the steady-state signal in going from no filter to full filter.

The integrated signal is equivalent to the direct-current level of the oscillatory signal. Consequently, it is necessary to multiply the magnitude of the integrated signal by a factor of $\pi/2$ to arrive at the amplitude of the component being measured.

In an actual embodiment of FIG. 24 the following components were used:

Transformers 524—Model SO–1553 by Southwestern Industrial Electronics, 2881 Post Oak Rd., Houston 19, Texas;

Diodes 528—IN483

Potentiometer 508—20 ohms

Amplifier 534—Brown Electronik Model 357926 by Minn.-Honeywell Regulator Co., Phila., Pa.

Servo Motor 536—Model 1252, Minn.-Honeywell Regulator Co., Phila., Pa.

Relay 546—Model CR2791K114A1 by General Electric Co., Schenectady, N.Y.

Span Potentiometer 550—2500 ohms

Integrator capacitor 552—1000–8000 micro-farads

Recorder 514—Brown Model Y153X(28)VV-X(IV)(G)(P6)(U)(V), Minn.-Honeywell Regulator Co., Phila., Pa.

Resistor 545—100 ohms

Capacitor 546—1.0 microfarad

Figure 25:
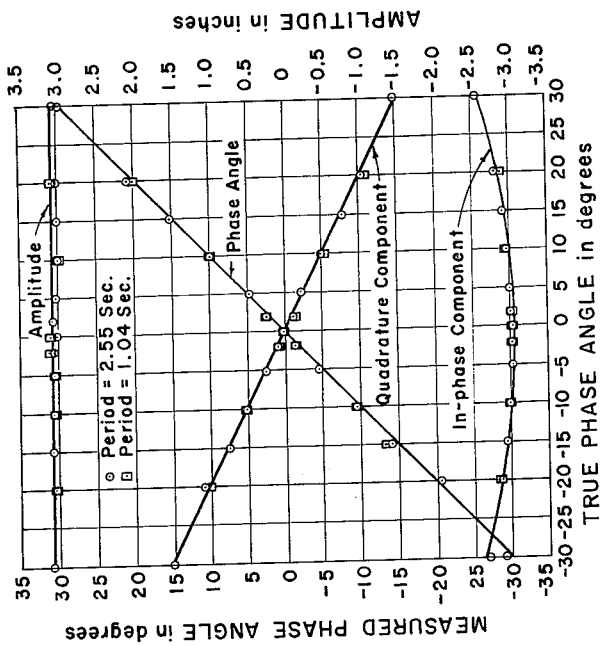
FIG. 25 is a graph showing an evaluation of the accuracy of equipment in accordance with the invention.

The validity of the force-component-separator and integrator has been established on basis of controlled laboratory tests. The core of a force gage was oscillated approximately sinusoidally at each of two frequencies and at a known amplitude. Predetermined phase angles between the struts were varied over a range of about ±40 degrees. The results of such a study are shown in FIG. 25 which compares measured values with known or precisely computed values. The study has demonstrated that the amplitude of any individual component is determined to an accuracy of within 1 percent. This is comparable with the accuracies usually obtained in refined steady-state tests.

As thus disclosed, the planar motion mechanism and recording system provide a means for applying hydrodynamically pure pitching and heaving motions to a model, a gage system for measuring the forces and roll moments in three dimensions, and a recording system for automatically resolving these moments into in-phase and quadrature components and for making a permanent record.

The planar motion mechanism provides a new gage system which permits the measurement of the reaction forces in three dimensions of a body moving through a fluid.

The roll moment about the X axis is provided by the roll gage while the resolving of the Y and Z forces provides a system of directly measuring the moments about the Y and Z axes.

In addition the roll oscillator provides a means for forcing a submarine model through small amplitudes of roll about the X axis and measuring the resultant XYZ and roll moment forces to explicitly measure the coefficients for the equations of rolling motion.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. A planar motion mechanism and recording system for a model adapted to be towed through water in a towing basin, comprising a table, a pair of struts spaced in the tow-direction, each strut having model attachment means at its lower end, means for slidably securing the upper ends of said struts to said table, a movable carriage mounted above said basin and having means supporting said table, motor means including a drive shaft mounted on said table, strut-sliding means comprising an eccentric means connected between said shaft and said struts for oscillating said model in sinusoidal motion, said driving means comprising a phase changer for said eccentric means for varying the phase relationship of the motion of said struts to obtain hydrodynamically pure pitching, pure heaving, and combined pitching and heaving motions, a counterbalance mounted on said table and connected to said struts for minimizing the hydrodynamic load on said motor means, a plurality of flexure gages having an electrical output and forming a part of said attachment means between said struts and model for measuring the reaction forces in a plurality of degrees of freedom of said model on said strut, a synchronous switch means operated by said drive shaft and connected to the electrical output of said gages for resolving said output into in-phase and quadrature components, means connected to said synchronous switch for measurably sensing said in-phase and quadrature components, and a recorder connected to said measuring means for recording said components.

2. A planar motion mechanism comprising a table means; a pair of parallel struts, means for attaching said struts to said table means for movement with respect to said table means, an end of each strut having means for receiving a test model whose motion coefficients may be determined through operation of said planar motion mechanism; moving means mounted on said table means for selectively moving said struts in harmonic motion; means forming a part of said moving means for varying the phase relationship of the motion of said struts; and sensing means connected to said struts for providing an electrical output measurably sensing reaction forces on said model in motion.

3. A planar motion mechanism according to claim 2 and further characterized by means operated by said moving means connected to said sensing means to receive said output for resolving said output into in-phase and quadrature forces.

4. A planar motion mechanism according to claim 3 and further characterized by means connected to said resolving means for recording said in-phase and quadrature forces.

5. An invention as defined in claim 1 but further characterized by a means attached to at least one of said struts for oscillatory rolling said model, and means for measurably sensing the rolling.

6. In a device for testing a model having a longitudinal axis, a planar motion mechanism comprising a table, a pair of spaced struts connected between said table and model along said axis, a plurality of gages mounted in the connection between said struts and said model including at least one roll gage having a movable flexural shaft whereby said model may rotate freely about said axis, a roll oscillator comprising a motor means attached to one of said struts and having a sinusoidal motion output, and means connecting said motor means output to said flexural shaft for oscillating said model about said axis.

7. In a planar motion mechanism, a roll gage comprising a flexural shaft having a flexural section, a flange at one end for attachment to a model, and a fastening means at the other end of said shaft, an armature mounted around said flexural section comprising three rings having transversely extending fingers which cooperate with each other to form a plurality of air gaps extending transversely to said flexural section, and a magnetic coil attached to said shaft, mounted around said flexural section, and having an output proportional to the variation in length of said air gaps as said flexural element deflects in torsion.

8. In a planar motion mechanism and recording system, a recording system comprising a force gage mounted in said mechanism and having an oscillatory output, a synchronous switch connected to said gage output and operated by said mechanism for resolving said gage output into in-phase and quadrature components, a detector and a servo null indicator connected to said synchronous switch for measuring said components, and a recorder connected to said detector and servo null indicator for recording said components.

9. In apparatus of a type described, a planar motion mechanism for carrying a model whose coefficients for motion equations thereof are to be ascertained, the model having a longitudinal axis, comprising a table for supporting the model, a shaft rotatably carried by the table, said shaft extending in the direction of the model-axis, a motor means for continuously rotating said shaft, a pair of crank arms spaced along said shaft, means connecting said crank arms to said shaft for rotating said crank arms, said connecting means including adjustable means for adjustably fixing the relative angular spacing of said crank arms angularly about said shaft, a piston for each of said crank arms, and a connecting rod connecting each piston with its associated crank arm, a cylinder for each piston in which the piston is adapted to reciprocate upon rotation of said shaft, fastening means fastening said cylinders to said table, a pair of model-carrying struts one for each piston, and securing means securing the upper ends of said struts to the associated pistons.

10. An invention as defined in claim 9 but further characterized by said adjustable means comprising a pair of angularly adjustable disc members secured to said shaft, means for displacing said discs angularly with respect to one another, and for indicating the amount of relative angular displacement.

11. An invention as defined in claim 10 but further characterized by said securing means comprising means for adjusting the longitudinal spacing of said struts.

12. An invention as defined in claim 9 but further characterized by said cylinder fastening means comprising means fastening said cylinders perpendicularly to said table.

13. In apparatus of a type described, a planar motion mechanism for carrying a model whose coefficients for motion equations thereof are to be ascertained, the model having a longitudinal axis, comprising a table for supporting the model, means for tilting said table, a shaft rotatably carried by the table, said shaft extending in the direction of the model-axis, a motor means for continuously rotating said shaft, a pair of crank arms spaced along said shaft, means connecting said crank arms to said shaft for rotating said crank arms, said connecting means including adjustable means for adjustably fixing the relative angular spacing of said crank arms angularly about said shaft, a piston for each of said crank arms, and a connecting rod connecting each piston with its associated crank arm, a cylinder for each piston in which the piston is adapted to reciprocate upon rotation of said shaft, fastening means fastening said cylinders to said table, a pair of model-carrying struts one for each piston, and said cylinder fastening means fastening said cylinders perpendicularly to said table.

14. In apparatus of a type described, a planar motion mechanism for carrying a model whose coefficients for motion equations thereof are to be ascertained, the model having a longitudinal axis, comprising a table for supporting the model, a shaft rotatably carried by the table, said shaft extending in the direction of the model-axis, a motor means for continuously rotating said shaft, a pair of struts spaced in the direction of said axis and having lower ends provided with attaching means for receiving said model, said struts extending in a transverse direction with respect to said shaft, a first means attaching a first of said struts to said shaft for continuous reciprocation when said shaft rotates, a second means attaching the second strut to said shaft for continuous reciprocation when said shaft rotates, said first and second means having adjusting means for selectively fixing the angular phase relations of reciprocation of said struts to provide pure heaving or pure pitching of said model.

15. An invention as defined in claim 14 wherein said adjusting means has indicating means for setting the angular phase relation of said struts so that $$\cos \phi_B = \frac{1-\left(\frac{\omega x}{U}\right)^2}{1+\left(\frac{\omega x}{U}\right)^2}$$

where:

$\phi_s$ is the phase angle between struts,
$\omega$ is the frequency of oscillation,
$x$ is the distance of each strut from the CG, and
$U$ is the forward speed of the model.

16. An invention as defined in claim 14 but further characterized by said lower ends of struts just above said attaching means being longitudinally smaller than the upper parts of said struts.

17. An invention as defined in claim 14 but further characterized by said attaching means comprising a plurality of force-measuring flexural gages, each gage being measurable sensitive only to a force in one direction.

18. A device of the type described, a model, means for moving said model with respect to a fluid, said means comprising a pair of spaced struts for supporting said model, a separate set of flexure gages secured to each of said struts, and means to secure said sets of flexure gages to different points in said model so that forces between said struts and model act through said gages, said gages measurably sensing different directional-components of said forces.

19. A device as defined in claim 18 but further characterized by said moving means comprising means for reciprocating said struts in a predetermined phase relation.

20. A device as defined in claim 19 but further characterized by means for changing said phase relation of the reciprocating struts.

21. A device as defined in claim 18 but further characterized by said points on said model being equidistant from the center of gravity of the model.

22. A planar motion mechanism for the determination of motion characteristics of a body, comprising a pair of spaced struts, attachment means at the lower end of each of said struts to receive the body, means for moving said struts in harmonic motion at the same frequency, and phase changer means for adjusting the phase relation of the motion of said struts.

23. A mechanism as defined in claim 22 but further characterized by said attachment means at each strut comprising a plurality of series-connected flexure gages connected to measurably sense different components of reaction forces on said body in motion.

24. A mechanism as defined in claim 23 wherein each of said gages comprises a pair of spaced parallel plates, a plurality of flexures extending between a pair of end-faces of said plates, a pedestal extending from an inner side of each of said plates toward but terminating short of the other plate, said plates being spaced in one of the plane-directions of said plates, a transducer comprising an electromagnetic coil and a core, said coil being carried by one of said pedestals, and said core being carried by the second of said pedestals.

25. A flexure gage of a type described comprising a rectangular prismatic block comprising a pair of spaced parallel plates, a plurality of flexures extending between a pair of end-faces of said plates, a pedestal extending from an inner side of each of said plates toward but terminating short of the other plate, said plates being spaced in one of the plane-directions of said plates, a transducer comprising an electromagnetic coil and a core, said coil being carried by one of said pedestals, and said core being carried by the second of said pedestals.

26. A flexure gage as defined in claim 25 wherein said block is one piece of metal.

27. A planar motion mechanism comprising a supporting means, a pair of spaced parallel struts carried by said supporting means in a plane, each strut having a lower end, each end having means for attaching the associated strut to a point on a test model whose motion coefficients may be determined through operation of said planar motion mechanism, and means for forcibly moving said struts in adjustably-phased harmonic motion relative to each other, said attachment means including force-measuring means responsive to reaction forces on said model in motion.

28. A mechanism as defined in claim 27 but further characterized by including means for translating said supporting means.

(References on following page)

References Cited in the file of this patent

UNITED STATES PATENTS

| | | |
|---|---|---|
| 2,490,574 | Austin | Dec. 6, 1949 |
| 2,685,200 | Slottow et al. | Aug. 3, 1954 |
| 2,700,896 | Root | Feb. 1, 1955 |
| 2,782,636 | Peucker | Feb. 26, 1957 |
| 2,826,064 | Hastings | Mar. 11, 1958 |
| 2,859,613 | Green | Nov. 11, 1958 |
| 2,958,056 | Giovanni | Oct. 25, 1960 |

FOREIGN PATENTS

| | | |
|---|---|---|
| 290,898 | Germany | Mar. 23, 1916 |

OTHER REFERENCES

Publication: The David W. Taylor Model Basin (Report 569), April 1947, page 9.